United States Patent [19]

Nagayasu

[11] Patent Number: 5,164,896
[45] Date of Patent: Nov. 17, 1992

[54] POSITIONING SYSTEM

[75] Inventor: Isao Nagayasu, Fujisawa, Japan

[73] Assignee: Micron Instrument Inc., Tokyo, Japan

[21] Appl. No.: 481,194

[22] Filed: Feb. 20, 1990

[30] Foreign Application Priority Data

| Feb. 17, 1989 | [JP] | Japan | 1-17625[U] |
| Nov. 27, 1989 | [JP] | Japan | 1-136923[U] |
| Nov. 27, 1989 | [JP] | Japan | 1-136924[U] |
| Nov. 27, 1989 | [JP] | Japan | 1-136925[U] |
| Jan. 25, 1990 | [JP] | Japan | 2-5915[U] |
| Jan. 25, 1990 | [JP] | Japan | 2-5924[U] |

[51] Int. Cl.⁵ .............................................. G05B 11/18
[52] U.S. Cl. ........................ 364/167.01; 364/182; 318/467; 318/592
[58] Field of Search ............... 364/167.01, 474.28, 364/474.34, 474.37, 182; 318/466, 467, 468, 603, 604, 652, 592, 594

[56] References Cited

U.S. PATENT DOCUMENTS

| 3,729,669 | 4/1973 | Whitney et al. | 318/594 |
| 4,021,714 | 5/1977 | Jones et al. | 318/594 |
| 4,312,033 | 1/1982 | Sweeney et al. | 364/182 |
| 4,549,271 | 10/1985 | Nozawa et al. | 364/474.37 |
| 4,599,547 | 7/1986 | Ho | 318/594 |
| 4,710,865 | 12/1987 | Higomura | 364/182 |
| 4,731,567 | 3/1988 | Dands et al. | 318/594 |
| 4,821,203 | 4/1989 | Carlton et al. | 364/167.01 |
| 4,914,566 | 4/1990 | Steutermann | 364/167.01 |
| 4,933,834 | 6/1990 | Gotou et al. | 364/183 |
| 4,987,526 | 1/1991 | Slocum et al. | 364/167.01 |
| 5,034,877 | 7/1991 | Shultz | 364/167.01 |

*Primary Examiner*—Jerry Smith
*Assistant Examiner*—Paul Gordon
*Attorney, Agent, or Firm*—Oblon, Spivak, McClelland, Maier & Neustadt

[57] ABSTRACT

A positioning system moves a movable element along a path and detects the movable element in a plurality of predetermined positions spaced along the path. The movable element is positioned selectively in the positions using a signal indicative of the detected movable element in the positions and a positioning command.

5 Claims, 20 Drawing Sheets

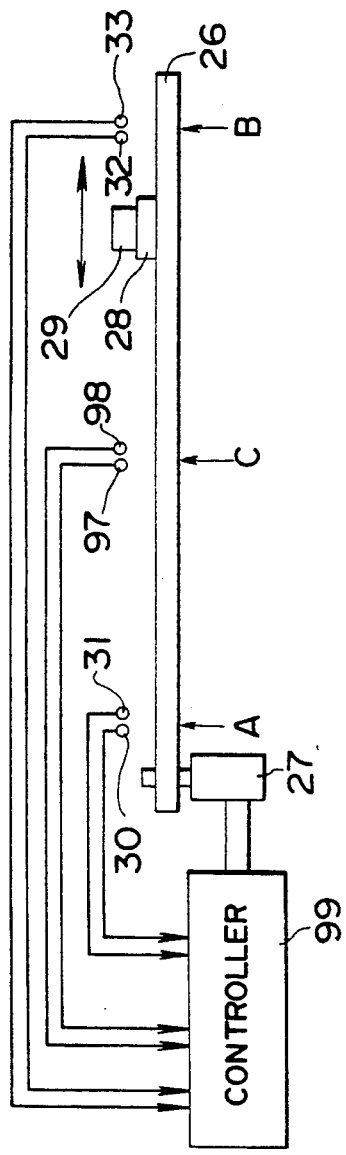
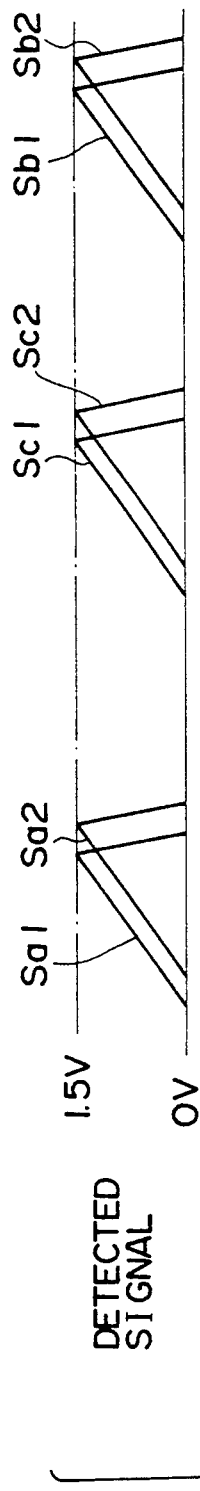
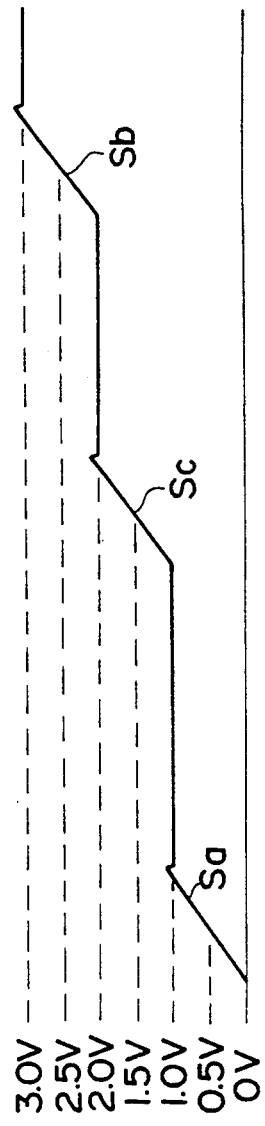

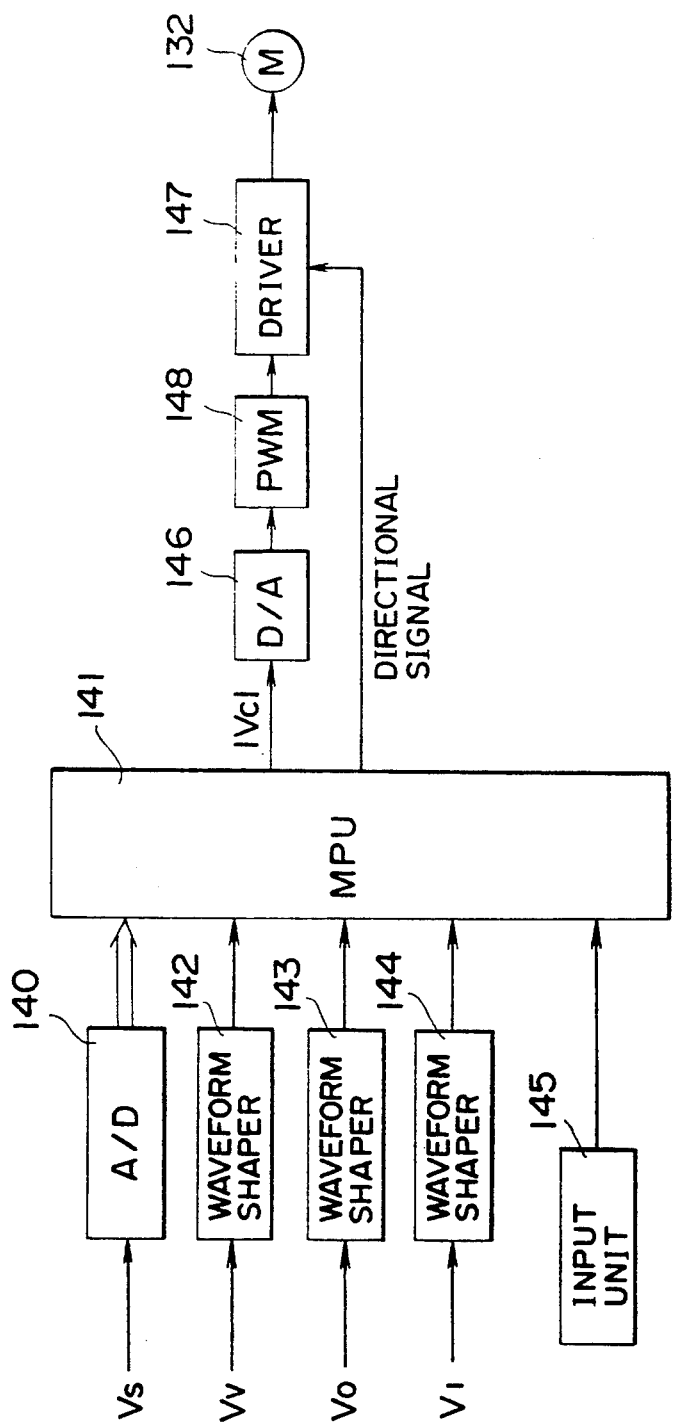

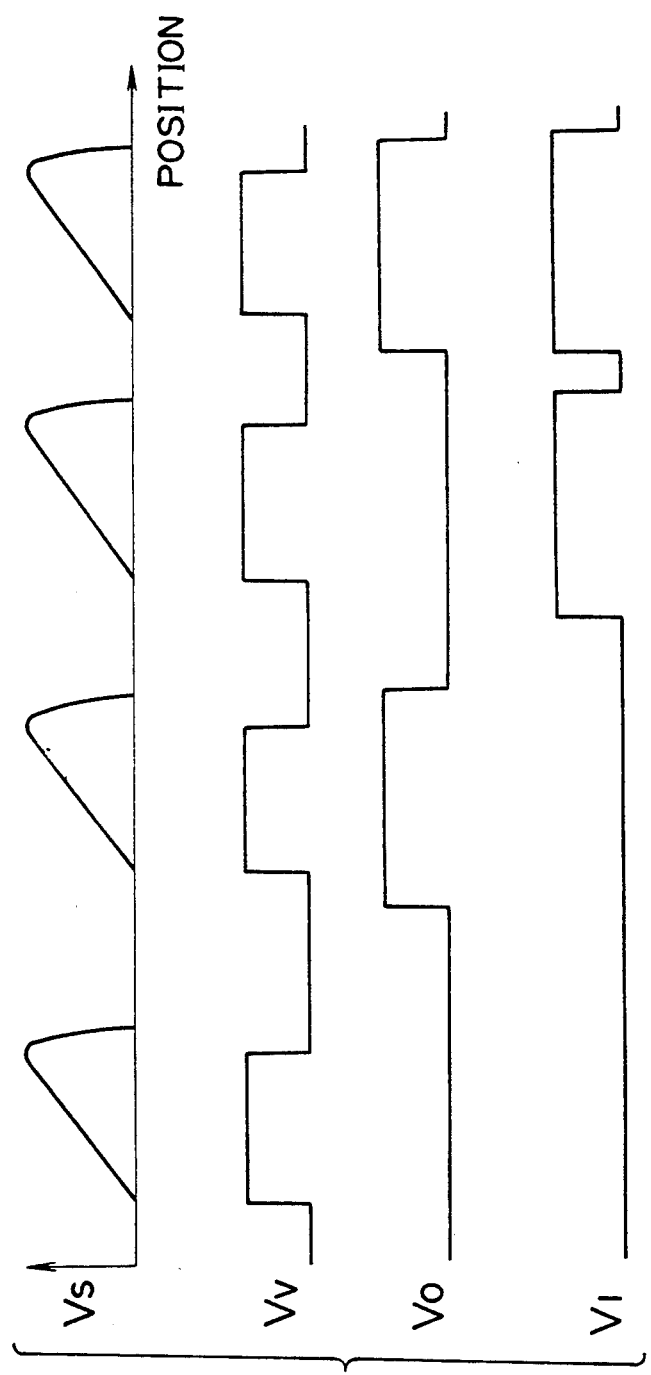

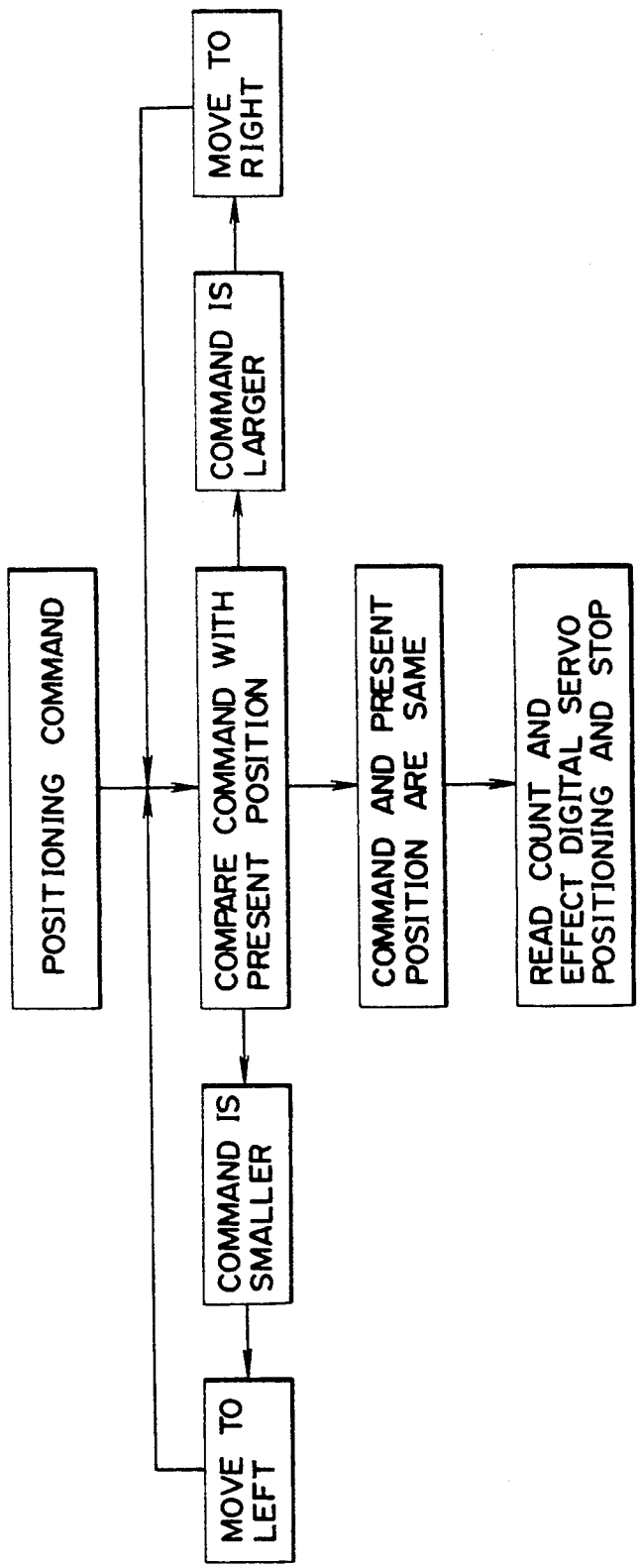

POSITIONING SYSTEM

BACKGROUND OF THE INVENTION

1. Field of the Invention:

The present invention relates to a positioning system for positioning a movable element in any of a plurality of positions along a linear, circular, or otherwise shaped path.

2. Description of the Prior Art:

Some conventional positioning systems for moving and positioning a movable element in a desired position along a linear, circular, or otherwise shaped path employ a recently developed intelligent flexible positioning actuator which can stop the movable element in any position along the path, which position can freely be selected by a software program. According to one such positioning actuator, the position of a movable element is detected by an encoder, output pulses from the encoder are counted, and the movable element is moved by an air cylinder or the like and stopped in any desired position along the path while referring to the count.

The programmable positioning actuator, which can position the movable element in any position along the path while counting output pulses from the encoder, has too many functions, is too complex in operation and arrangement, and too expensive for such an application in which the movable element is simply required to be positioned in any one of a plurality of predetermined positions along the path. Furthermore, when the movable element is moved and stopped by an air cylinder or the like, the movable element may overrun the position where it is to be stopped. If an air cylinder is employed, the movable element is positioned thereby at a positioning error of about 1 mm, and hence the positioning accuracy is poor.

SUMMARY OF THE INVENTION

It is an object of the present invention to provide a positioning system for positioning a movable element in a selected one of a plurality of predetermined positions, the positioning system being simple in arrangement and operation, inexpensive, and capable of positioning the movable element with high accuracy.

Another, object of the present invention is to provide a positioning system which employs a small number of position sensors and is simple in arrangement.

According to the present invention, there is provided a positioning system comprising an actuator for moving a movable element along a path, a motor for operating the actuator to move the movable element, a plurality of position detectors for detecting the movable element within limited ranges near a plurality of predetermined positions along the path and for generating respective signals which vary depending on the position of the movable element, and a circuit for determining differences between output signals from the position detectors and a reference value, for selecting one of the differences depending on a positioning command, and for controlling the motor in a position servo loop based on the selected difference.

According to the present invention, there is also provided a positioning system comprising an actuator for moving a movable element along a path, a plurality of sensors for detecting the movable elements within limited ranges near a plurality of predetermined positions along the path and for generating a plurality of two-phase signals, a signal converting circuit for converting the two-phase signals into a single signal composed of signals corresponding to the two-phase signals and having a plurality of levels, command means for giving a positioning command, a comparator for comparing the positioning command given by the command means with the single signal from the signal converting means and for producing an output signal indicative of the difference between the positioning command and the single signal, and driver means for driving the actuator with the output signal from the comparator.

According to the present invention, there is further provided a positioning system comprising a path along which a movable element is movable, a plurality of detectable members disposed within limited ranges near a plurality of positions along the path, the detectable members having respective values corresponding to the positions, respectively, and analog positional information indicative of linearly variable positional relationship thereof to the movable element near the positions, driver means for moving the movable element, a position sensor integrally mounted on the movable element, for detecting the values and the analog positional information from the detectable members, and control means, responsive to a positioning command, for controlling the driver means so that one of the values detected by the position sensor will coincide with a positioning command thereby to move the movable element into the vicinity of a position indicated by the positioning command, and for then controlling the driver means so that the analog positional information detected by the position sensor will coincide with the positioning command thereby position the movable element in the position indicated by the positioning command.

According to the present invention, there is also provided a positioning system comprising a path along which a movable element is movable, a plurality of detectable members disposed within limited ranges near a plurality of positions along the path, the detectable members having mutually different detectable quantities, a position sensor integrally mounted on the movable element, for detecting the detectable quantities of the detectable members, position detecting means for detecting a position of the movable element near each of the plurality of positions, and control means, responsive to a positioning command, for moving the movable element into the vicinity of a position indicated by the positioning command so that a signal detected by the position sensor will coincide with the positioning command, and for then positioning the movable element in the position indicated by the positioning command so that the position detected by the position detecting means will coincide with the positioning command.

According to the present invention, there is also provided a positioning system comprising substantially positioning means responsive to a positioning command for moving a movable element into the vicinity of one of a plurality of predetermined positions, which is indicated by the positioning command, along a path, a pulse encoder for generating a pulse signal in coaction with the movable element, positioning detecting means for detecting the position of the movable element according to the pulse signal from the pulse encoder, and local positioning means for positioning the movable element so that the position of the movable element will coincide with the one position indicated by the positioning command, after the movable element has been positioned by the substantially positioning means.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a schematic view of a positioning system according to a third embodiment of the present invention;

FIG. 11 is a diagram showing the waveforms of signals produced by the positioning system of the third embodiment;

FIG. 16 is a block diagram of a control circuit of the positioning system of the fourth embodiment;

FIGS. 17 through 19 are diagrams showing the waveforms of signals produced by the positioning system of the fourth embodiment;

FIG. 32 is a flowchart of a processing sequence of an MPU in the control circuit shown in FIG. 30.

DETAILED DESCRIPTION OF THE PREFERRED EMBODIMENTS

Figure 1:
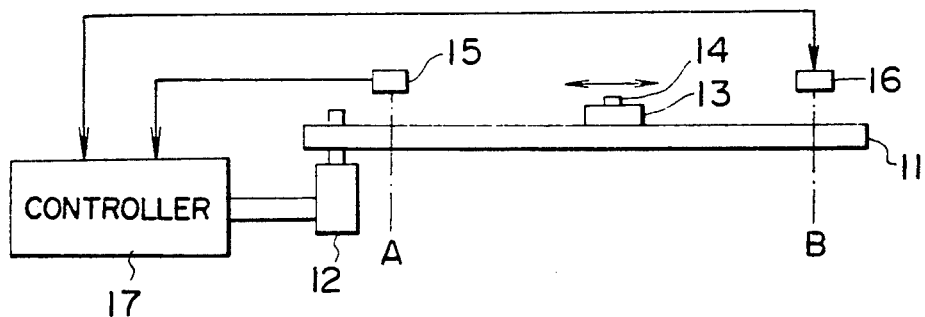
FIG. 1 is a schematic view of a positioning system according to a first embodiment of the present invention.

FIG. 1 schematically shows a positioning system in accordance with a first embodiment of the present invention.

Figure 2:
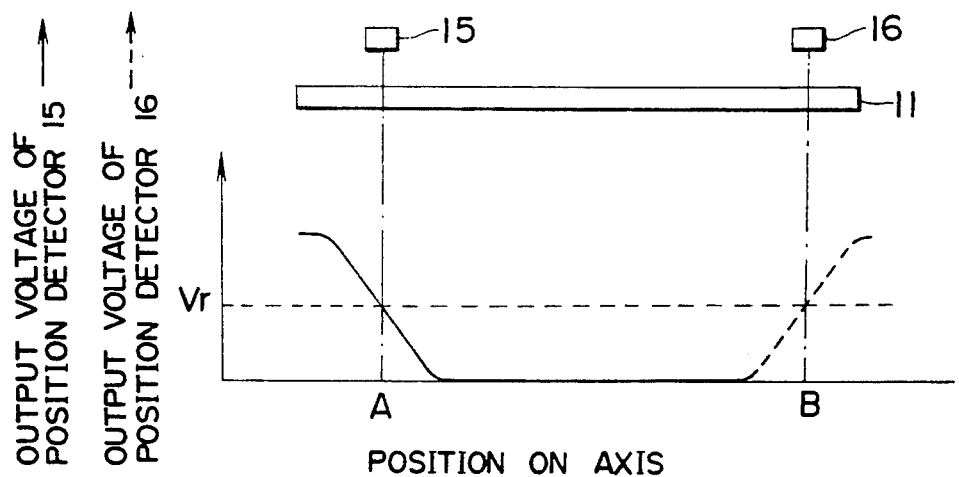
FIG. 2 is a diagram showing output characteristics of position sensors of the positioning system of the first embodiment.

The positioning system includes an actuator 11 in the form of a ball screw, a belt or the like which is drivable by a servomotor 12 to move a movable element 13 approximately between two positions of a plurality of predetermined positions, such as a stop position A and a stop position B, along a linear, circular, or otherwise shaped path. A magnet 14 is fixedly mounted on the movable element 13. Position detectors 15, 16 are disposed in the stop positions A, B, respectively. When the position detectors 15, 16 detect the magnet 14 in limited ranges near the stop positions A, B, the position detectors 15, 16 detect the movable element 13 in limited ranges near the stop positions A, B. As shown in FIG. 2, the output signals from the position detectors 15, 16 linearly vary when the movable element 13 moves in the vicinity of the stop positions A, B, and have a reference value Vr when the movable element 13 is positioned in the stop positions A, B. The output signals from the position detectors 15, 16 are fed back to a controller 17, which determines the difference between the values of the output signals and the reference value Vr. In order to eliminate the difference, the controller 17 controls the motor 12 in a position servo loop to move and stop the movable element 13 in one of the stop positions A, B depending on a positioning command.

Figure 3:
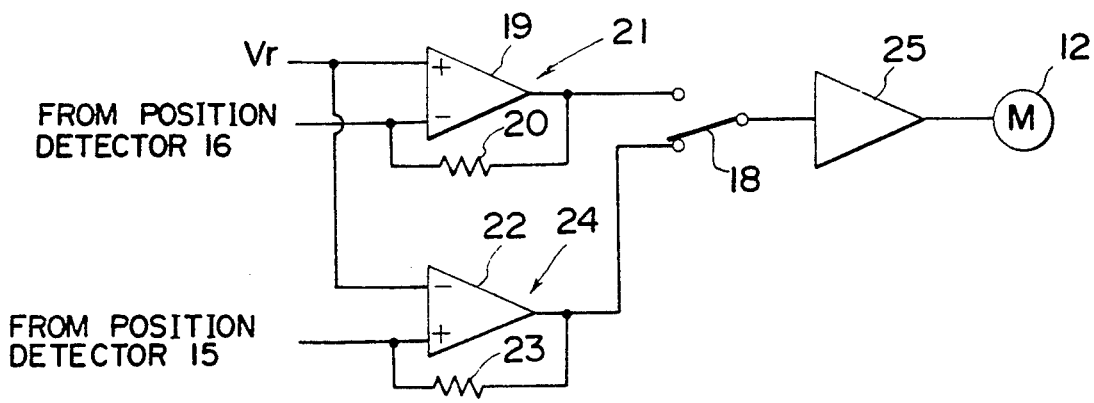
FIG. 3 is a block diagram of a controller of the positioning system of the first embodiment.

The controller 17 is shown in detail in FIG. 3. The controller 17 comprises a switch 18 for giving a positioning command to determine the direction in which to move the movable element 13, an amplifier circuit 21 composed of an operational amplifier 19 and a resistor 20, an amplifier circuit 24 composed of an operational amplifier 22 and a resistor 23, and a motor driver 25 composed of an amplifier. The amplifier circuit 21 is supplied with the output signal from the position detector 16 and a reference voltage Vr from a reference power supply (not shown), whereas the amplifier circuit 24 is supplied with the output signal from the position detector 15 and the reference voltage Vr.

In order to move the movable element 13 to the right (FIG. 1) and stop the movable element 13 in the stop position B, the switch 18 is shifted toward the amplifier circuit 21 to give a positioning command for positioning the movable element 13 in the stop position B. The output signal from the position detector 16 is compared with the reference voltage Vr by the amplifier circuit 21 which detects the difference or error therebetween. An output signal from the amplifier circuit 21 is applied through the switch 18 to the motor driver 25, which then energizes the motor 12 to move the movable element 13 to the right. The movable element 13 is moved toward the stop position B at the righthand end in a position servo loop, and stopped in the stop position B with high accuracy.

In order to move the movable element 13 to the left (FIG. 1) and stop the movable element 13 in the stop position A, the switch 18 is shifted toward the amplifier circuit 24 to give positioning command for positioning the movable element 13 in the stop position A. The output signal from the position detector 15 is compared with the reference voltage Vr by the amplifier circuit 24 which detects the difference or error therebetween. An output signal from the amplifier circuit 24 is applied through the switch 18 to the motor driver 25, which then energizes the motor 12 to move the movable element 13 to the left. The movable element 13 is moved toward the stop position A at the lefthand end in a position servo loop, and stopped in the stop position A with high accuracy.

While the movable element 13 is positionable in one of the two positions A, B in the illustrated embodiment, another position detector may be disposed intermediate between the stop positions A, B for detecting the movable element 13 in an intermediate position between the positions A, B, an output signal from the other position detector may be compared with the reference voltage Vr by another amplifier circuit, and an output signal from the other amplifier circuit may be applied through the switch 18 to the motor driver 25, so that the movable element may be positioned in the intermediate position. According to another modification, the amplifier circuits 21, 24 may be supplied with different reference voltages.

The positioning system according to the first embodiment is relatively simple in operation and arrangement, and inexpensive. Since the movable element 13 is positioned by a position servo loop, it can be positioned highly accurately. If an air cylinder is employed in place of the motor 12, the movable element 13 can be positioned with an error which is about 1/10 of the error of the conventional positioning system which employs an air cylinder to move the movable element.

Figure 5:
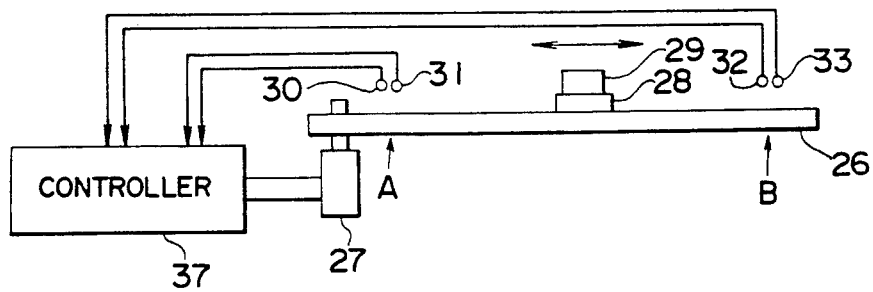
FIG. 5 is a schematic view of the positioning system according to the second embodiment.

FIG. 5 shows a positioning system according to a second embodiment of the present invention.

The positioning system includes a linear actuator 26 in the form of a ball screw, a belt or the like which is drivable by a servomotor 27 to move a movable element 28 approximately between two predetermined stop positions A, B along a linear, circular, or otherwise shaped path. A magnetic circuit 29 and magnetic sensitive elements 30, 31, 32, 33 jointly constitute two position sensors, which are disposed in a range that is sufficiently smaller than the range in which the movable element 28 is movable. The magnetic circuit 29 is fixedly mounted on the movable element 28.

Figure 6:
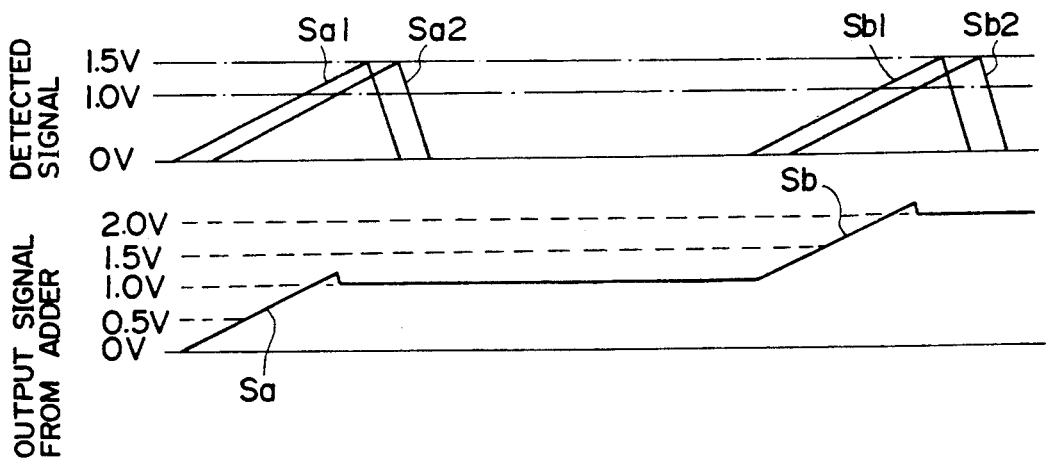
FIG. 6 is a diagram showing the waveforms of signals produced by the positioning system of the second embodiment.
Figure 7A:
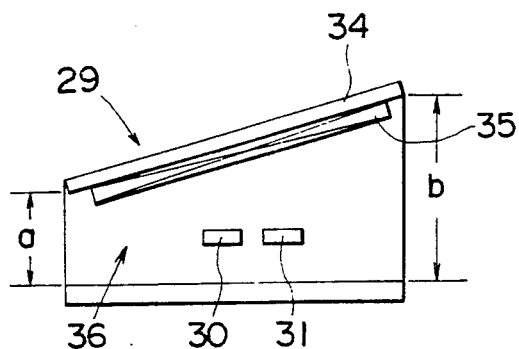
FIGS. 7(a) and 7(b) are front and side elevational views of a magnetic circuit of the positioning system of the second embodiment.
Figure 7B:
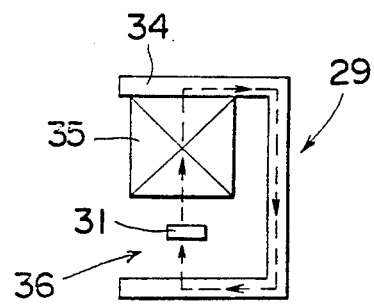

As shown in FIGS. 7(a) and 7(b), the magnetic circuit 29 comprises a yoke 34 of an inverted C-shaped cross section and a permanent magnet 35. The permanent magnet 35 has an upper surface magnetically connected to the inner surface of an upper arm of the yoke 34, with a gap 36 defined between the lower surface of the magnet 35 and the upper surface of a lower arm of the yoke 34. The upper arm of the yoke 34 is linearly slanted along its width. Therefore, the gap 36 has a dimension *a* at the lefthand end (FIG. 7(a)) and a dimension *b* at the righthand end, the dimensions *a*, *b* being different from each other, so that the width of the gap 36 linearly varies. A magnetic flux passes through the magnetic circuit 29 as indicated by the arrows in FIG. 7(b). The magnetic field in the gap 36 has an intensity which linearly varies along the width of the yoke 34 (i.e., in the direction in which the movable element 28 moves). The magnetic sensitive elements 30, 31 which are paired are disposed in the position A where the movable element 28 is to be stopped (i.e., positioned), and the other magnetic sensitive elements 32, 33 which are paired are disposed in the position B where the movable element 28 is to be stopped. The two pairs of magnetic sensitive elements 30, 31, 32, 33 are located such that they pass through the gap 36 when the magnetic circuit 29 moves with the movable element 28. When the magnetic sensitive elements 30, 31, 32, 33 enter the gap 36 in the magnetic circuit 29 which is driven by the linear actuator 26, approximately in the stop positions A, B, these magnetic sensitive elements 30, 31, 32, 33 detect the intensity of the magnetic field in the gap 36, thereby detecting the movable element 28 actuated by the linear actuator 26 and producing two-phase signals Sa1, Sa2, Sb1, Sb2, respectively, as shown in FIG. 6. Each of these signals Sa1, Sa2, Sb1, Sb2 has a voltage which varies from 0 V to 1.5 V. In response to the signals Sa1, Sa2, Sb1, Sb2 from the magnetic sensitive elements 30, 31, 32, 33, a controller 37 controls the motor 27 to move the movable element 28 toward and stop the same in the position A or B.

Figure 4:
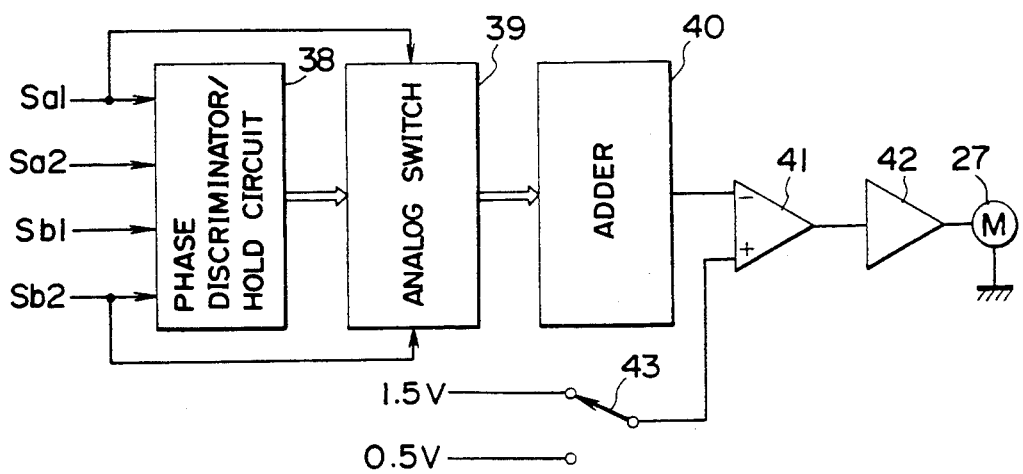
FIG. 4 is a block diagram of a controller of a positioning system according to a second embodiment of the present invention.

FIG. 4 shows the controller 37 in greater detail.

The controller 37 comprises a phase discriminator/hold circuit 38, an analog switch 39, an adder 40, a comparator 41 comprising a differential amplifier, a motor driver 42 comprising an amplifier, and a switch 43. The phase discriminator/hold circuit 38 serves to discriminate the phases of and hold the two-phase signals Sa1, Sa2, Sb1, Sb2 from the two pairs of magnetic sensitive elements 30, 31, 32, 33. The analog switch 39, responsive to an output signal from the phase discriminator/hold circuit 38, selectively issues the signals Sa1, Sb1 from the magnetic sensitive elements 30, 32 and the reference voltage Vr of 1.0 V. The adder 40 adds the output voltages from the analog switch 39 and produces a signal, as shown in FIG. 6, which is composed of two signals Sa, Sb corresponding to the above two sets of two-phase signals and having levels that do not substantially overlap each other. As shown in FIG. 6, the signal Sa varies from 0 V to about 1 V, the signal Sb varies from 1.0 to about 2.0 V, and the other signal portion than these signals Sa, Sb is of 0 V or 1 V. The signals Sa, Sb are of 0.5 V and 1.5 V, respectively, when the movable element 28 is in the stop positions A, B. The switch 43 serves to give a positioning command for stopping the movable element 28 in either the position A or the position B. The switch 43 selects either 0.5 V or 1.5 V for the level of a command signal indicative of the positioning command. The differential amplifier 41 compares the output signal from the adder 40 and the command signal from the switch 43 and produces an output signal representative of the difference therebetween. In response to the output signal from the differential amplifier 41, the motor driver 42 energizes the motor 27 to move the movable element 28 to the stop position A or B.

Figure 9:
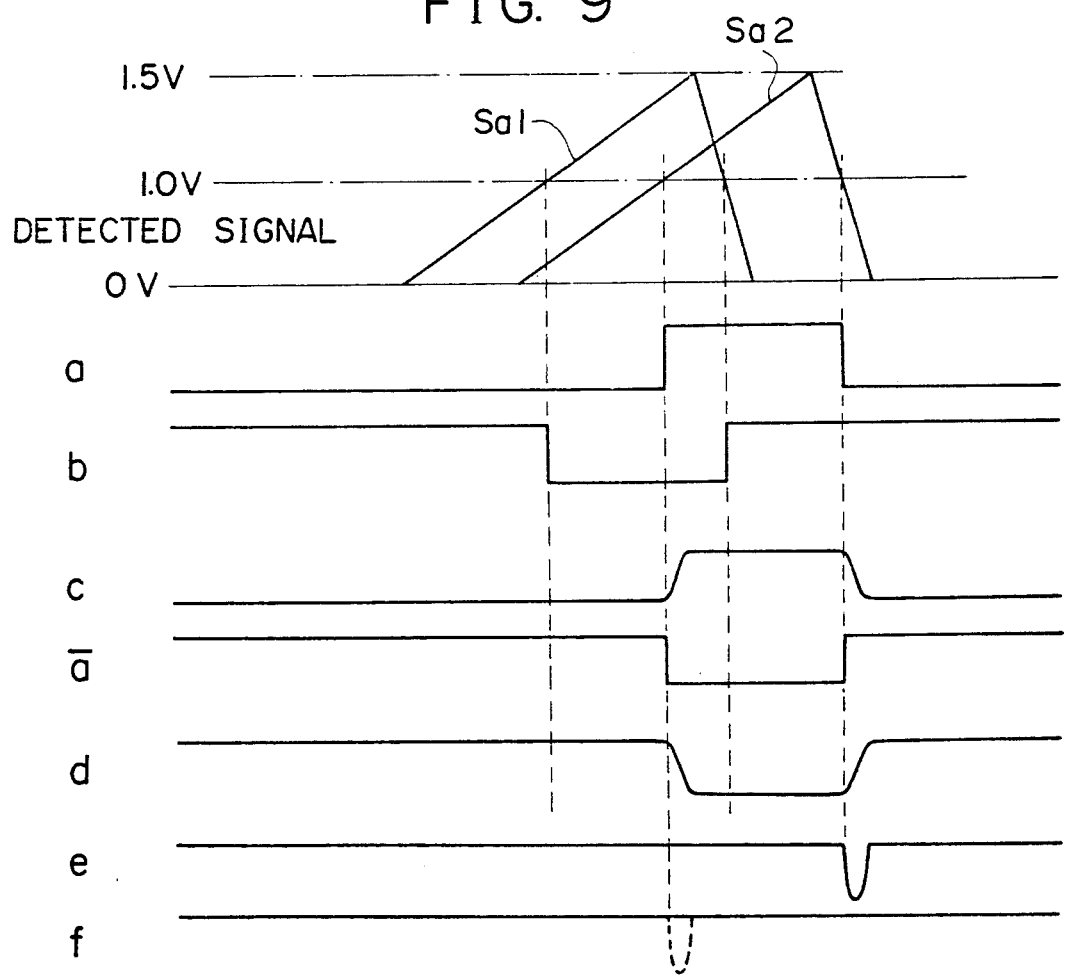
FIG. 9 is a timing chart of signals in the circuit shown in FIG. 8.
Figure 8:
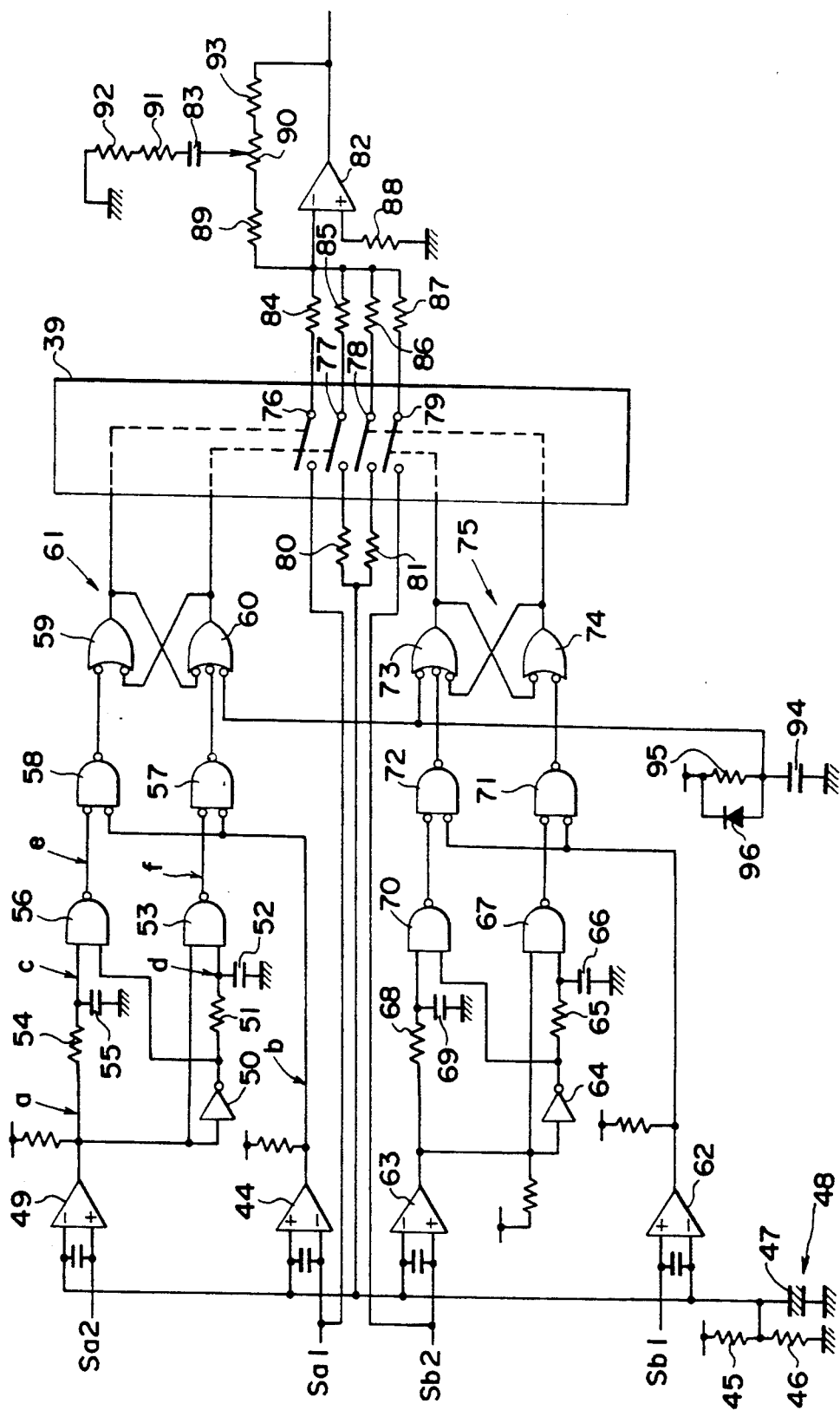
FIG. 8 is a circuit diagram of a portion of the controller of the positioning system of the second embodiment.

FIG. 8 shows the phase discriminator/hold circuit 38, the analog switch 39, and the adder 40 in greater detail. FIG. 9 is a timing chart of signals produced in the circuit arrangement shown in FIG. 8.

The signal Sa1 from the magnetic sensitive element 30 is converted into a binary pulse signal *b* by a comparator 44 through comparison with a reference voltage of 1.0 V applied from a circuit 48 which comprises resistors 45, 46 and a capacitor 47. The signal Sa2 from the magnetic sensitive element 31 is converted into a binary pulse signal $a$ by a comparator 49 through comparison with the reference voltage of 1.0 V applied from the circuit 48. The pulse signal $a$ is inverted by an inverter 50 and then delayed by an integrating circuit which comprises a resistor 51 and a capacitor 52. An output signal $d$ from the integrating circuit and the pulse signal $a$ from the comparator 49 are NANDed by a NAND gate 53. The pulse signal $a$ from the comparator 49 is delayed by an integrating circuit which comprises a resistor 54 and a capacitor 55. An output signal $c$ from the integrating circuit and the pulse signal from the inverter 50 are NANDed by a NAND gate 56. Output signals $e, f$ from the NAND gates 53, 56 are selectively issued depending on whether the movable element 28 moves to the left or the right, so that the phases of the two-phase signals Sa1, Sa2 are discriminated. The pulse signal $b$ from the comparator 44 passes through NOR gates 57 58 in response to the output signals $e, f$ from the NAND gates 53, 56. A flip-flop 61 which comprises NAND gates 59, 60 serves as a hold circuit that is set by an output signal from the NOR gate 58 and reset by an output signal from the NOR gate 57.

The signal Sb1 from the magnetic sensitive element 32 and the signal Sb2 from the magnetic sensitive element 33 are similarly processed by a circuit arrangement which comprises comparators 62, 63, an inverter 64, resistors 65, 68, capacitors 66, 68, and NAND gates 67, 70 through 74, similarly to the above circuit arrangement including the comparators 44, 49, the inverter 50, the resistors 51, 54, the capacitors 52, 55, and the NAND gates 52, 56 through 60. In this manner, the two-phase signals Sb1, Sb2 are discriminated in phase and held by a flip-flop 74 which is composed of the NAND gates 73, 74.

The analog switch 49 comprises four switches 76, 77, 78, 89 which can be turned on, i.e., closed, by respective output signals from the NAND gates 59, 60, 73, 74 to pass therethrough the signal Sa1 from the magnetic sensitive element 30, the voltage of 1.0 V supplied from the circuit 48 through a resistor 80, the voltage of 1.0 V supplied from the circuit 48 through a resistor 81, and the signal Sb2 from the magnetic sensitive element 32. The adder 40 comprises an operational amplifier 82, a capacitor 83, and resistors 84 through 93, and adds output signals from the switches 76, 77, 78, 89.

FIG. 10 shows a positioning system according to a third embodiment of the present invention, for stopping a movable element 28 in either one of two positions A, B and an intermediate position C therebetween.

Figure 12:
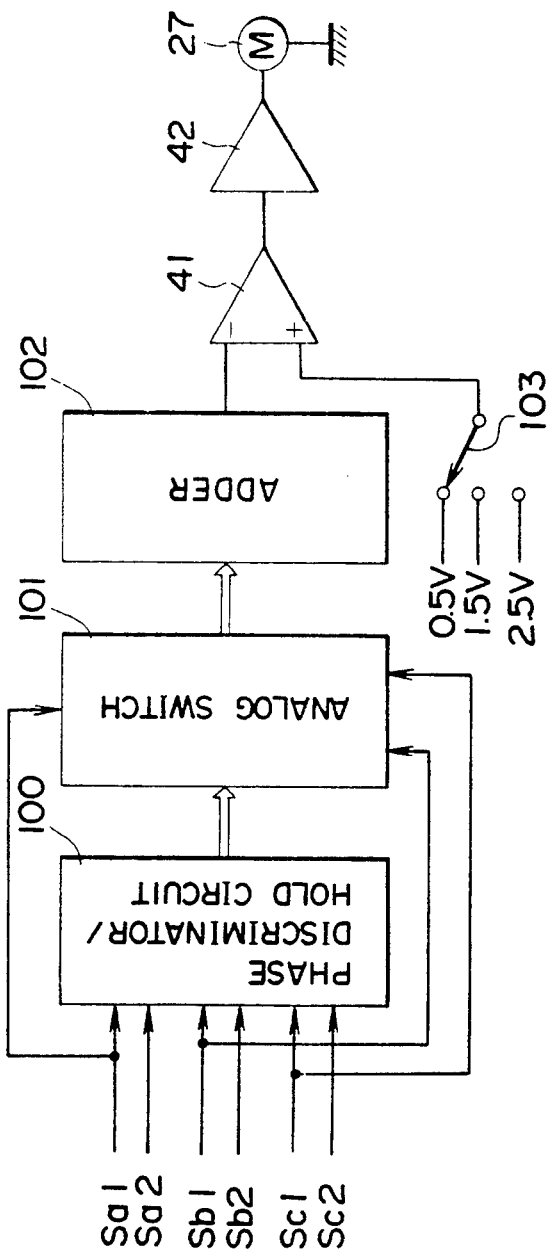
FIG. 12 is a block diagram of a controller of the positioning system of the third embodiment.
Figure 13:
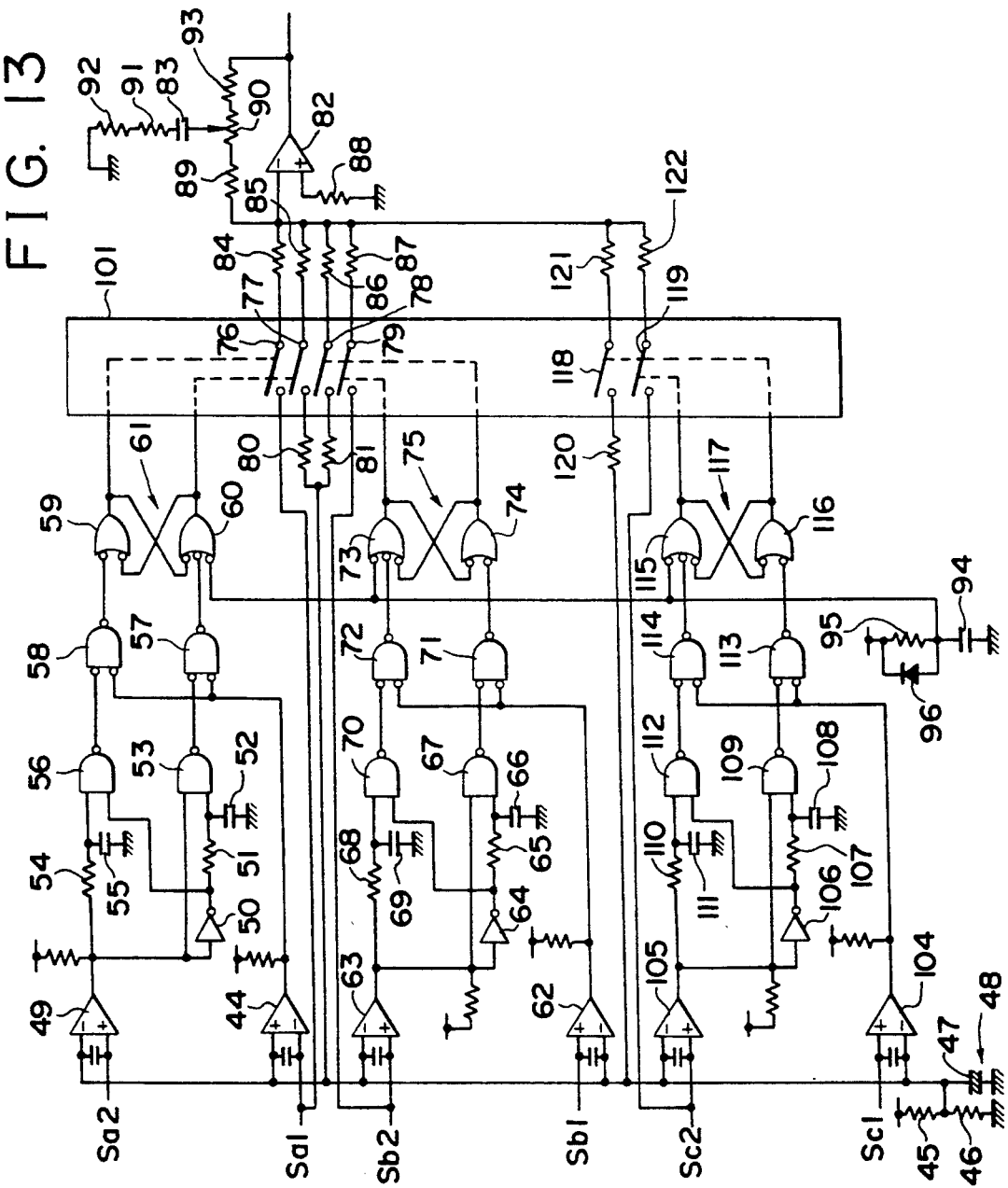
FIG. 13 is a circuit diagram of a portion of the controller of the positioning system of the third embodiment.

The positioning system shown in FIG. 10 is similar to the positioning system shown in FIG. 5, but additionally has two magnetic sensitive elements 97, 98 located in the position C. The two additional magnetic sensitive elements 97, 98 detect the intensity of the magnetic field in the gap 36 in the magnetic circuit 29, and generates two-phase signals Sc1, Sc2 in the vicinity of the position C, as shown in FIG. 11. The positioning system shown in FIG. 10 comprises, as shown in FIG. 12, a phase discriminator/hold circuit 100, an analog switch 101, an adder 102, a comparator 41 comprising a differential amplifier, a motor driver 42 comprising an amplifier, and a switch 103. As shown in FIG. 13, the phase discriminator/hold circuit 100 is similar to the phase discriminator/hold circuit 38 shown in FIG. 4, but additionally has a circuit for processing the signals Sc1, Sc2 from the magnetic sensitive elements 97, 98. The signal Sc1 from the magnetic sensitive element 97 and the signal Sc2 from the magnetic sensitive element 98 are similarly processed by a circuit arrangement which comprises comparators 104, 105, an inverter 106, resistors 107, 110, capacitors 108, 111, and NAND gates 109, 112 through 116, similarly to the circuit arrangement shown in FIG. 8 which includes the comparators 44, 49, the inverter 50, the resistors 51, 54, the capacitors 52, 55, and the NAND gates 52, 56 through 60. The two-phase signals Sc1, Sc2 are discriminated in phase and held by a flip-flop 117 which is composed of the NAND gates 115, 116.

The analog switch 101 is similar to the analog switch 39 shown in FIG. 8, but has two additional switches 118, 119 which can be turned on, i.e., closed, by respective output signals from the NAND gates 115, 116 to pass therethrough the voltage of 1.0 V supplied from the circuit 48 through a resistor 120 and the signal Sc1 from the magnetic sensitive element 97. The adder 102 is similar to the adder shown in FIG. 8, but additionally has resistors 121, 122. The adder 102 adds output voltages from the switches 76, 77, 78, 79, 118, 119 and produces a signal which is composed of three signals Sa, Sb, Sc corresponding to the three sets of two-phase signals and having levels that do not substantially overlap each other, as shown in FIG. 11. The signal Sa varies from 0 V to about 1 V, the signal Sc varies from 1.0 to about 2.0 V, the signal Sb varies from 2.0 V to about 3.0 V, and the other signal portion than these signals Sa, Sb, Sc is of 0 V or 1.0 V or 2.0 V. The signals Sa, Sb, Sc are of 0.5 V, 2.5 V, 1.5 V, respectively, when the movable element 28 is in the stop positions A, B, C. The switch 103 serves to give a positioning command for stopping the movable element 28 in either the position A or the position B or the position C. The switch 103 selects either 0.5 V or 1.5 V or 2.5 V for the level of a command signal indicative of the positioning command. Those parts of the positioning system of the third embodiment which are identical to those of the positioning system of the second embodiment are denoted by identical reference numerals.

In the second and third embodiments, the magnetic circuit 29 is integrally mounted on the movable element 28. However, a pair of magnetic sensitive elements may be mounted on the movable element 28, and magnetic circuits may be disposed in the respective stop positions.

The positioning system according to each of the second and third embodiments is relatively simple in operation and arrangement, and can position an actuator-driven movable element selectively in a plurality of positions along a linear, circular or otherwise shaped path, and can also change the direction in which to move the movable element.

Figure 14:
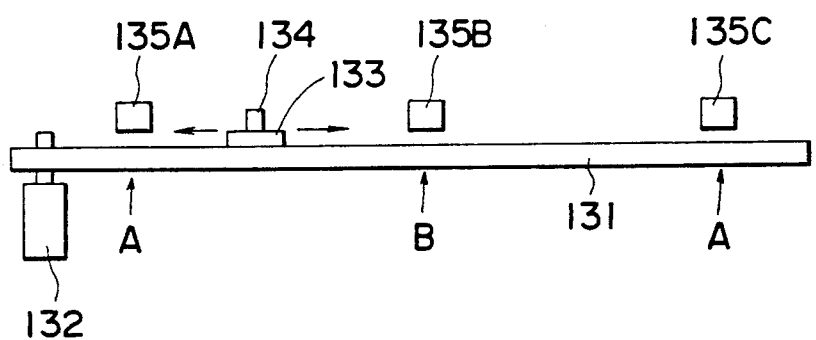
FIG. 14 is a schematic view of a positioning system according to a fourth embodiment of the present invention.

FIG. 14 shows a positioning system according to a fourth embodiment of the present invention.

The positioning system has an actuator 131 and a motor 132 which jointly serve as a driver means for moving a movable element 133. The actuator 131 is driven by the actuator 132 to move the movable element 133 along a linear, circular, or otherwise shaped path. A position sensor 134 which comprises a magnetic sensitive element, for example, is integrally mounted on the movable element 133. Detectable members 135A, 135B, 135C each comprising a magnetic circuit are disposed within limited ranges near a plurality of predetermined positions, e.g., three positions A, B, C, in which the movable element 133 can be positioned along the path.

Figures 15A, 15B, 15C, 15D:
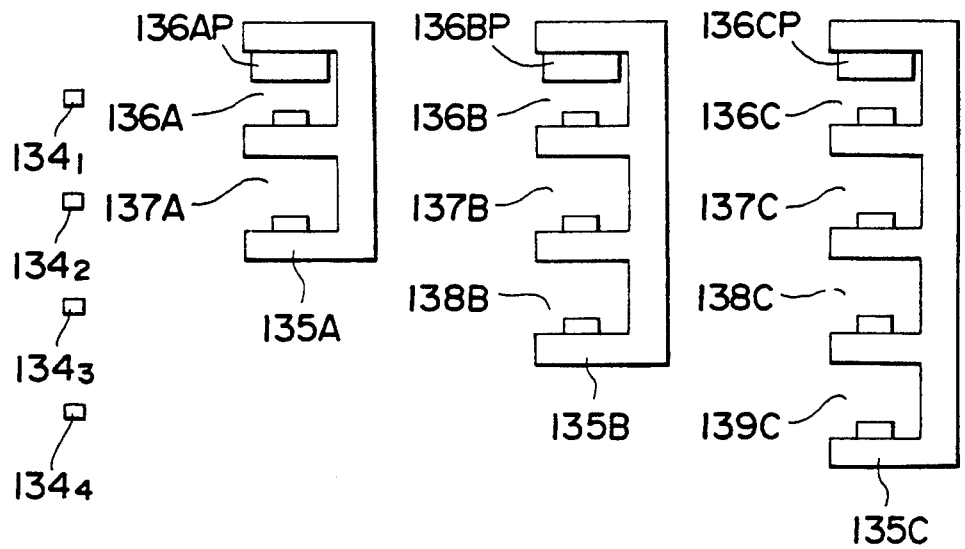
FIGS. 15(a) through 15(d) are views of magnetic sensitive elements and magnetic circuits in the positioning system of the fourth embodiment.

As shown in FIG. 15(a), the magnetic sensitive element 134 actually comprises four magnetic sensitive elements $134_1$, $134_2$, $134_3$, $134_4$ which are arrayed in a direction substantially normal to the path along which the movable element 133 is movable. The magnetic sensitive element $134_1$ is a position servo magnetic sensitive element for accurately positioning the movable element 133. The magnetic sensitive element $134_2$, is a magnetic sensitive element for detecting a region in which output signals from the magnetic sensitive elements $134_1$, $134_3$, $134_4$ are effective. The magnetic sensitive elements $134_3$, $134_4$ serve to detect the positions A, B, C. As illustrated in FIGS. 15(b) through 15(d), the magnetic circuits 135A, 135B, 135C comprise permanent magnets and yokes, and have magnetic circuit portions 136A, 136B, 136C for actuating the magnetic sensitive element $134_1$, and magnetic circuit portions 137A, 137B, 137C for actuating the magnetic sensitive element $134_2$, and also selectively have magnetic circuit portions 138B, 138C, 139C for selectively actuating the magnetic sensitive elements $134_3$, $134_4$. The magnetic circuit portions 138B, 138C, 139C represent the positions A, B, C. More specifically, the position A is represented by a value of "00" without these magnetic circuit portions 138B, 138C, 139C being present. The position B is represented by a value of "10" with the magnetic circuit portion 138B being present. The position C is represented by a value of "11" with the magnetic circuit portions 138C, 139C being present.

Figure 18:
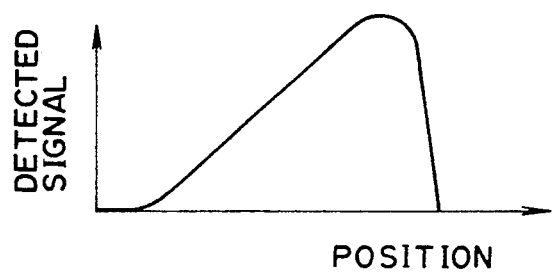

The magnetic circuit portions 136A, 136B, 136C have upper end surfaces 136AP, 136BP, 136CP, respectively, which are slanted such that the widths of gaps defined in the magnetic circuit portions 136A, 136B, 136C vary linearly in the direction in which the movable element 133 moves. Magnetic fluxes in the gaps vary linearly in the direction in which the movable element 133 moves. Therefore, the magnetic circuit portions 136A, 136B, 136C have analog positional information indicative of linearly variable positional relationship thereof to the movable element 133 depending on the magnetic fluxes in the gaps. As shown in FIG. 18, when magnetic sensitive element $134_1$ passes through the gaps in the magnetic circuit portions 136A, 136B, 136C as the movable element 133 moves, the magnetic sensitive element $134_1$ generates a signal whose amplitude linearly varies as the position of the movable element 133 varies. When the magnetic sensitive element $134_2$ passes through the gaps in the magnetic circuit portions 137A, 137B, 137C as the movable element 133 moves, the magnetic sensitive element $134_2$ generates a signal whose amplitude is substantially constant. Similarly, when the magnetic sensitive element $134_3$ passes through the gaps in the magnetic circuit portions 138B, 138C as the movable element 133 moves, the magnetic sensitive element $134_4$ generates a signal whose amplitude is substantially constant, and when the magnetic sensitive element 134 passes through the gap in the magnetic circuit portion 139C as the movable element 133 moves, the magnetic sensitive element $134_4$ generates a signal whose amplitude is substantially constant.

FIG. 16 shows a control circuit of the positioning system shown in FIG. 14, and FIG. 17 illustrates the waveforms of signals produced by the positioning system.

Figure 19:
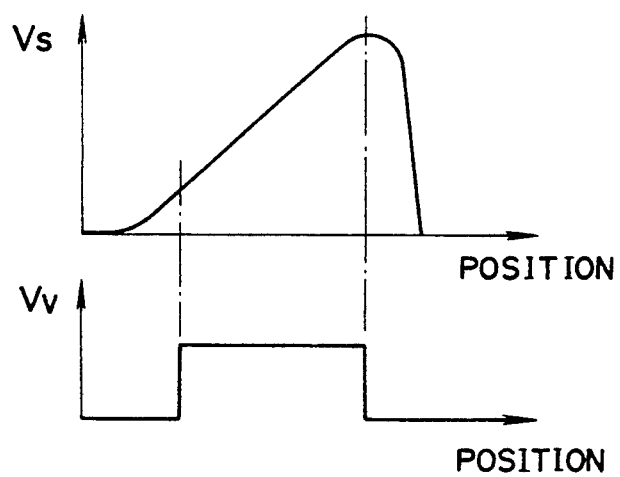

A signal Vs from the magnetic sensitive element $134_1$ is converted by an analog-to-digital (A/D) converter 140 into a digital signal which is then applied to a microcomputer (MPU) 141. Signals Vv, $V_0$, $V_1$ from the magnetic sensitive elements $134_2$, $134_3$, $134_4$ are shaped in waveform into binary signals by respective waveform shapers 142, 143, 144. The output signals Vv, $V_0$, $V_1$ from the waveform shapers 142, 143, 144 are applied to the MPU 141. As shown in FIG. 19, the output signal Vv from the waveform shaper 142 is of a high level within an effective range (where the amplitude linearly varies) of the signal Vs which is produced by the magnetic sensitive element $134_1$ when the magnetic sensitive element $134_1$ passes through the gaps in the magnetic circuit portions 136A, 136B, 136C. The MPU 141 is supplied with a positioning command Vr indicative of a target position (one of the positions A, B, C) to which the movable element 133 is to be moved, the positioning command Vr being entered from an input unit 145 by the operator.

Figure 20:
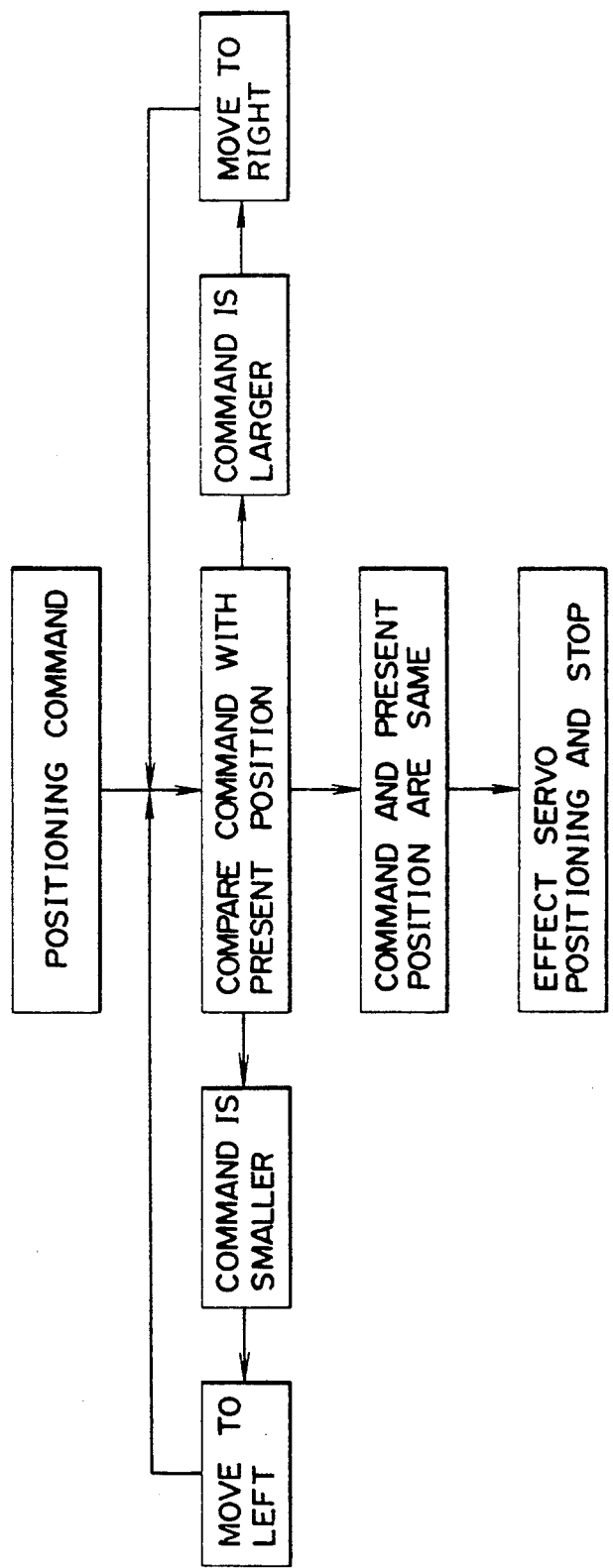
FIG. 20 is a flowchart of a processing sequence of an MPU in the control circuit shown in FIG. 16.

When the positioning command Vr is supplied from the input unit 145, the MPU 141 receives the output signals $V_0$, $V_1$ from the waveform shapers 143, 144 while receiving the output signal Vv from the waveform shaper 142, and determines the present position of the movable element 133 from these output signals $V_0$, $V_1$, as shown in FIG. 20. Then, the MPU 141 compares the present position and the positioning command Vr. If the present position is greater than the positioning command Vr, then the MPU 141 applies an output signal |Vc| to move the movable element 133 to the left to a digital-to-analog (D/A) converter 146, and also applies a directional signal to a driver 147. If the present position is smaller than the positioning command Vr, then the MPU 141 applies an output signal |Vc| to move the movable element 133 to the right to the D/A converter 146, and also applies a directional signal to the driver 147. The output signal |Vc| from the MPU 141 is converted by the D/A converter 146 into an analog signal, which is then pulse-width-modulated by a PWM circuit 148. The driver 147 rotates the motor 132 in a direction corresponding to the directional signal from the MPU 141 with pulses from the PWM 148, thereby moving the movable element 133. If the present position of the movable element 133 coincides with the positioning command Vr, since the movable element 133 is in the vicinity of the target position, the MPU 141 positions the movable element 133 in a servo loop based on data Vs' from the A/D converter 140. More specifically, MPU 141 effects the following calculation:

$$Vc = (Vr - Vs')Kp - Kv \cdot \frac{dVs'}{dt}$$

where Kp and Kv are constant.

Then, the MPU 141 applies the output signal |Vc| to the D/A converter 146. The MPU 141 compares the data Vs' from the A/D converter 140 with the positioning command Vr, and then supplies the driver 147 with the directional signal depending on the positive or negative sign of the result of the comparison. If the data Vs' from the A/D converter 140 agree with the positioning command Vr, then MPU 141 turns off the output signal |Vc| and the directional signal, thereby de-energizing the motor 132. The movable element 141 is now accurately positioned in the target position.

In the fourth embodiment, the MPU 141 may be arranged such that it contains the A/D converter 140, the waveform shapers 142, 143, 144, the D/A converter 146, and the PWM circuit 148. While the movable element 133 can be stopped in any of the three predetermined positions in the fourth embodiment, the positioning system may be arranged such that the movable element may be stopped in any of fourth or more predetermined positions. If the movable element 133 should be stopped in any of four predetermined positions, then the magnetic circuit portions 138B, 138C, 139C may be arranged to produce four values of "00", "01", "10", "11". If the movable element 133 should be stopped in any of eight predetermined positions, then the magnetic circuit portions 138B, 138C, 139C may be arranged to produce eight values. According to one modification, the magnetic sensitive elements $134_1$, $134_2$, $134_3$, $134_4$ may be replaced with photosensors, and the magnetic circuit portions 135A, 135B, 135C may be replaced with slitted plates. In such a modification, the photosensors detect the slits defined in the slitted plates to produce the same signals as those generated by the magnetic sensitive elements $134_1$, $134_2$, $134_3$, $134_4$.

Generally, a positioning system which employs position sensors requires such position sensors to be disposed respectively in a plurality of predetermined positions along a path. The positioning system should have as many position sensors as the number of the positions where a movable element is to be positioned. Therefore, if the movable element has to be positioned in many positions, the positioning system should employ also many position sensors, and hence the control circuit of the positioning system becomes highly complex. According to the fourth embodiment of the present invention, however, the positioning system can position the movable element with a smaller number of position sensors, and is simple in arrangement.

Figure 21:
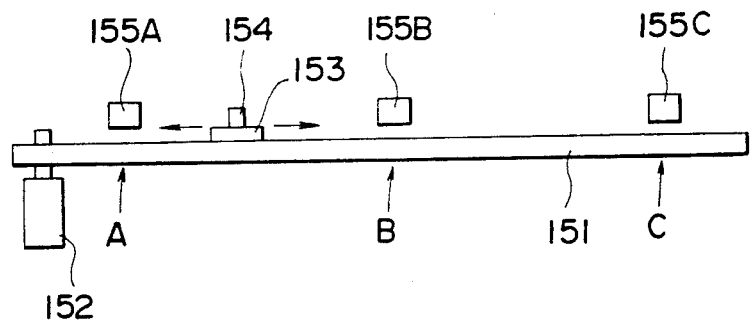
FIG. 21 is a schematic view of a positioning system according to a fifth embodiment of the present invention.

FIG. 21 shows a positioning system according to a fifth embodiment of the present invention.

The positioning system has an actuator 151 and a motor 152 which jointly serve as a driver means for moving a movable element 153. The actuator 151 is driven by the actuator 152 to move the movable element 153 along a linear, circular, or otherwise shaped path. A position sensor 154 which comprises a magnetic sensitive element, for example, is integrally mounted on the movable element 153. Detectable members 155A, 155B, 155C, 155D each comprising a magnetic circuit are disposed within limited ranges near a plurality of predetermined positions, e.g., fourth positions A, B, C, D in which the movable element 153 can be positioned along the path.

Figures 22A, 22B, 22C, 22D, 22E:
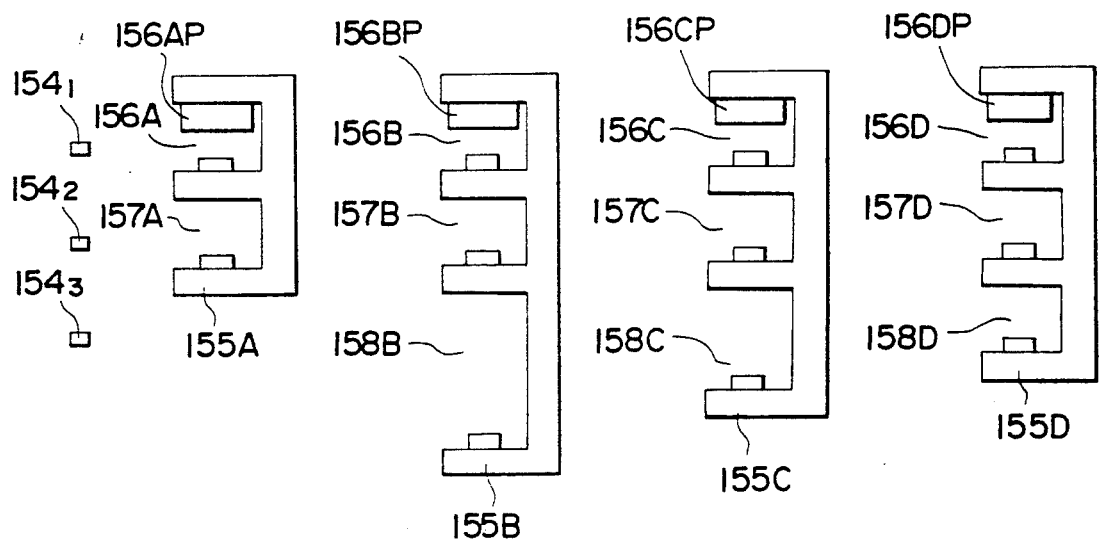
FIGS. 22(a) through 22(e) are views of magnetic sensitive elements and magnetic circuits in the positioning system of the fifth embodiment.

As shown in FIG. 22(a), the magnetic sensitive element 154 actually comprises three magnetic sensitive elements $154_1$, $154_2$, $154_3$ which are arrayed in a direction substantially normal to the path along which the movable element 153 is movable. The magnetic sensitive element 154, is a position servo magnetic sensitive element for accurately positioning the movable element 153. The magnetic sensitive element $134_2$, is a magnetic sensitive element for detecting a region in which output signals from the magnetic sensitive elements $154_1$, $154_3$, are effective. The magnetic sensitive elements $154_3$, serve to detect the positions A, B, C, D. As illustrated in FIGS. 22(b) through 22(e), the magnetic circuits 155A, 155B, 155C, 155D comprise permanent magnets and yokes, and have magnetic circuit portions 156A, 156B, 156C, 156D for actuating the magnetic sensitive element $154_1$, and magnetic circuit portions 157A, 157B, 157C, 157D for actuating the magnetic sensitive element $154_2$, and also selectively have magnetic circuit portions 158B, 158C, 158D for selectively actuating the magnetic sensitive element $154_3$. The magnetic circuit portions 158B, 158C, 158D represent the positions A, B, C, D as magnetic fluxes in the gaps in the magnetic circuit portions. More specifically, the magnetic fluxes in the gaps vary from each other, and have respective magnitudes at ratios of 0 : 1 : 2 : 3, for example. Therefore, the position A is represented by a value of "0" without these magnetic circuit portions 158B, 158C, 158D being present. The position B is represented by a value of "1" according to the magnetic flux in the magnetic circuit portion 158B. The position C is represented by a value of "2" according to the magnetic flux in the magnetic circuit portions 158C. The position D is represented by a value of "3" according to the magnetic flux in the magnetic circuit portion 158D.

Figure 25:
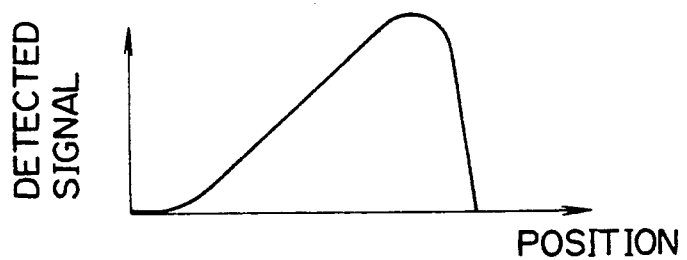

The magnetic circuit portions 156A, 156B, 156C, 156D have upper end surfaces 156AP, 156BP, 156CP, 156DP, respectively, which are slanted such that the widths of gaps defined in the magnetic circuit portions 156A, 156B, 156C, 156D vary linearly in the direction in which the movable element 153 moves. Magnetic fluxes in the gaps vary linearly in the direction in which the movable element 133 moves. Therefore, the magnetic fluxes in the gaps in the magnetic circuit portions 156A, 156B, 156C, 156D have analog positional information which is linearly variable with respect to the position of the movable element 153. As shown in FIG. 25, when the magnetic sensitive element $154_1$ passes through the gaps in the magnetic circuit portions 156A, 156B, 156C, 156D as the movable element 153 moves, the magnetic sensitive element $154_1$ generates a signal whose amplitude linearly varies as the position of the movable element 153 varies. When the magnetic sensitive element $154_2$, passes through the gaps in the magnetic circuit portions 157A, 157B, 157C, 157D as the movable element 153 moves, the magnetic sensitive element $154_2$ generates a signal whose amplitude is substantially constant. Similarly, when the magnetic sensitive element $154_3$ passes through the gaps in the magnetic circuit portions 158B, 158C, 158D as the movable element 153 moves, the magnetic sensitive element $154_3$ generates a signal whose amplitude is substantially constant. amplitude is substantially constant.

Figure 23:
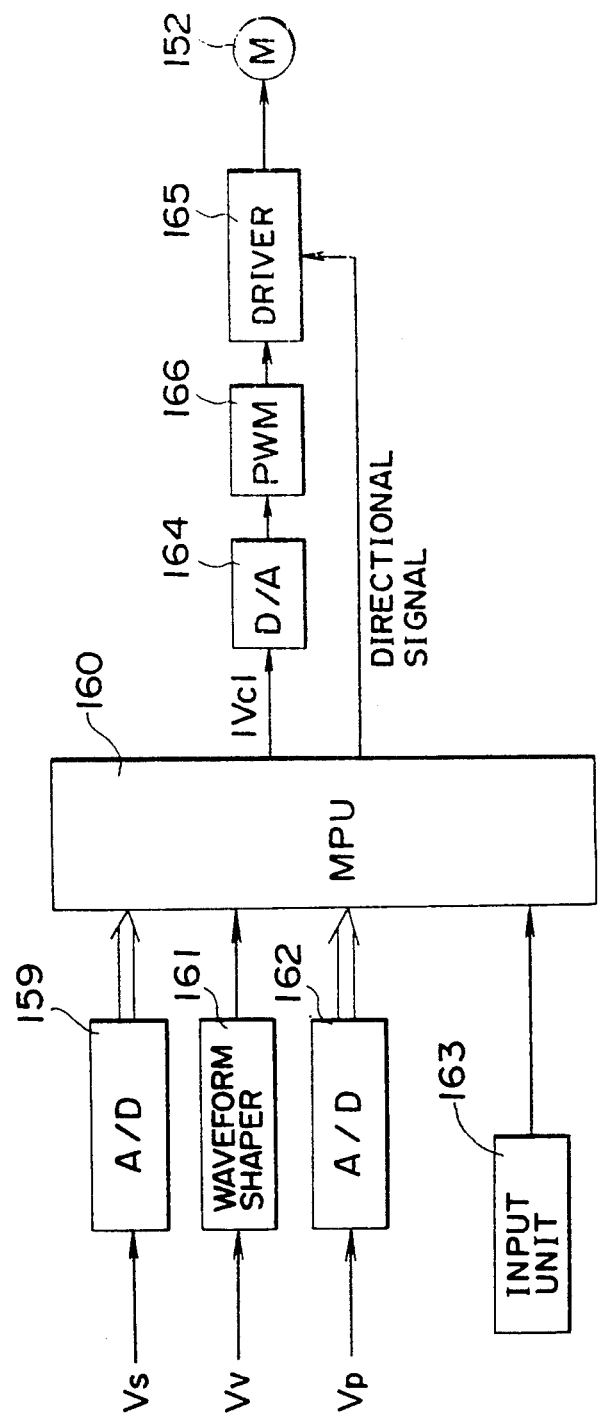
FIG. 23 is a block diagram of a control circuit of the positioning system of the fifth embodiment.
Figure 24:
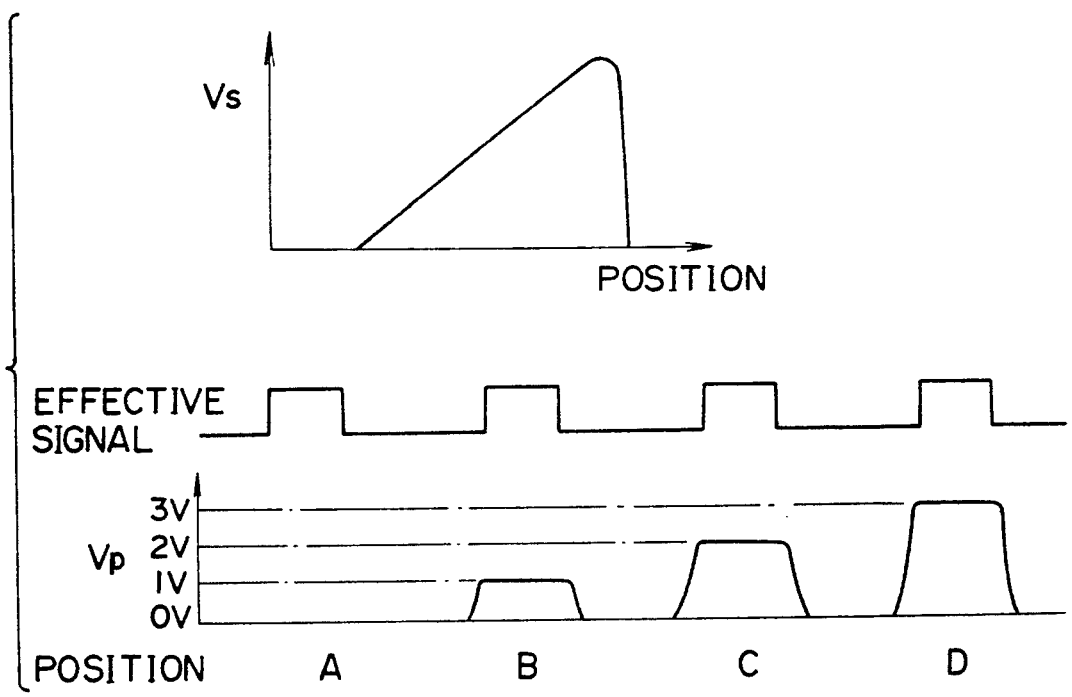
FIGS. 24 through 26 are diagrams showing the waveforms of signals produced by the positioning system of the fifth embodiment.

FIG. 23 shows a control circuit of the positioning system shown in FIG. 21, and FIG. 24 illustrates the waveforms of signals produced by the positioning system.

Figure 26:
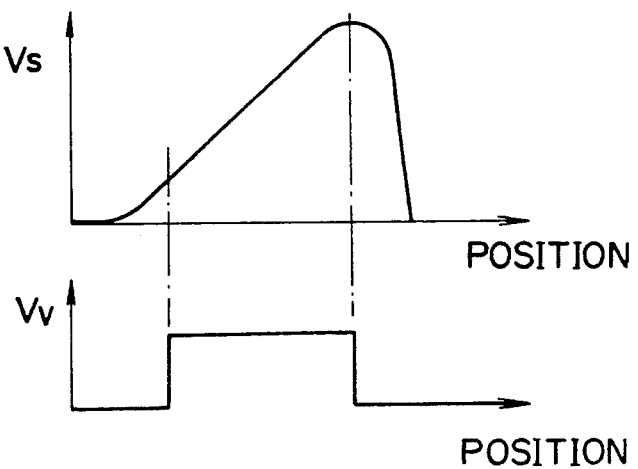

A signal Vs from the magnetic sensitive element $154_1$ is converted by a A/D converter 159 into a digital signal which is then applied to a microcomputer (MPU) 160. A signal Vv from the magnetic sensitive element $154_2$ is shaped in waveform into a binary signal by a waveform shaper 161. The output signal Vv from the waveform shaper 161 is applied to the MPU 160. A signal Vp from the magnetic sensitive element $154_3$ is converted by an A/D converter 162 into a digital signal which is then applied to the MPU 160. As shown in FIG. 26, the output signal from the waveform shaper 161 is of a high level within an effective range (where the amplitude linearly varies) of the signal Vs which is produced by the magnetic sensitive element $154_1$ when the magnetic sensitive element $154_1$ passes through the gaps in the magnetic circuit portions 156A, 156B, 156C, 156D. The signal Vp from the magnetic sensitive element $154_3$ is of a value which is 0 V, 1 V, 2 V, 3 V when the movable element 153 moves to the positions A, B, C, D, respectively, as shown in FIG. 24. The MPU 160 is supplied with a positioning command Vr indicative of a target position (one of the positions A, B, C, D) to which the movable element 153 is to be moved, the positioning command Vr being entered from an input unit 163 by the operator.

Figure 27:
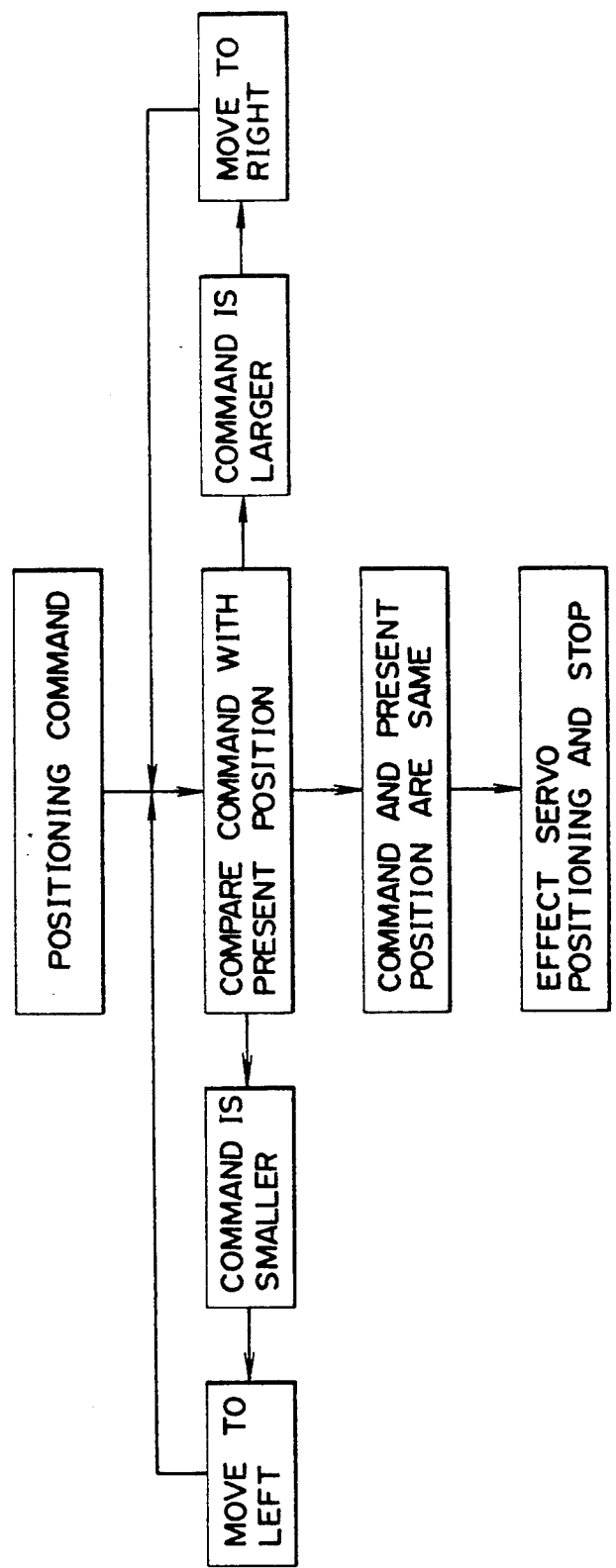
FIG. 27 is a flowchart of a processing sequence of an MPU in the control circuit shown in FIG. 23.

When the positioning command Vr is supplied from the input unit 163, the MPU 160 receives the output signal from the A/D converter 162 while receiving the output signal Vv from the waveform shaper 161, and determines the present position of the movable element 153 from the output signal from the A/D converter 162, as shown in FIG. 27. Then, the MPU 160 compares the present position and the positioning command Vr. If the present position is greater than the positioning command Vr, then the MPU 160 applies an output signal |Vc| to move the movable element 153 to the left to a D/A converter 164, and also applies a directional signal to a driver 165. If the present position is smaller than the positioning command Vr, then the MPU 160 applies an output signal |Vc| to move the movable element 153 to the right to the D/A converter 164, and also applies a directional signal to the driver 165. The output signal |Vc| from the MPU 160 is converted by the D/A converter 164 into an analog signal, which is then pulse-width-modulated by a PWM circuit 166. The driver 165 rotates the motor 152 in a direction corresponding to the directional signal from the MPU 160 with pulses from the PWM 166, thereby moving the movable element 153. Then, as is the case with the MPU 141 in the positioning system according to the fourth embodiment, the MPU 160 positions the movable element 153 in a servo loop based on data Vs' from the A/D converter 159.

Generally, a positioning system employs a plurality of detectable members selectively disposed in respective predetermined positions along a path along which a movable element moves. If the movable element is to be positioned in many positions, many detectable members should be employed, and the positioning system becomes complex in arrangement. According to the fifth embodiment, however, a plurality of detectable members having mutually different detectable quantities are disposed correspondingly to a plurality of predetermined positions along the path. Therefore, the positioning system of the fifth embodiment has a reduced number of detectable members, and hence is simple in arrangement.

FIG. 23 illustrates a positioning system according to a sixth embodiment of the present invention.

The positioning system has an actuator 171 and a motor 172 which jointly serve as a driver means for moving a movable element 173. The actuator 171 is driven by the actuator 172 to move the movable element 173 along a linear, circular, or otherwise shaped path. A position sensor 174 which comprises a magnetic sensitive element, for example, is integrally mounted on the movable element 173. Detectable members 175A, 175B, 175C each comprising a magnetic circuit are disposed within limited ranges near a plurality of predetermined positions, e.g., three positions A, B, C, in which the movable element 173 ca be positioned along the path.

Figures 29A, 29B, 29C, 29D:
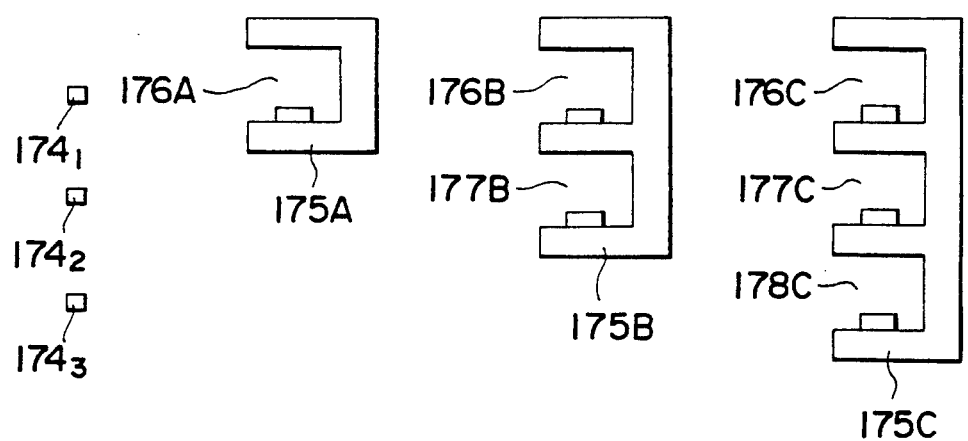
FIGS. 29(a) through 29(d) are views of magnetic sensitive elements and magnetic circuits in the positioning system of the sixth embodiment.

As shown in FIG. 29(a), the magnetic sensitive element 174 actually comprises three magnetic sensitive elements $174_1$, $174_2$, $174_3$ which are arrayed in a direction substantially normal to the path along which the movable element 173 is movable. The magnetic sensitive element $174_1$ is a magnetic sensitive element for detecting ranges near the predetermined positions A, B, C, in which the movable element 173 is to be accurately positioned, and for generating an effectiveness signal indicative of such ranges. The magnetic sensitive element $174_2$, $174_3$ serve to detect the positions A, B, C. As illustrated in FIGS. 29(b) through 29(d), the magnetic circuits 175A, 175B, 175C comprise permanent magnets and yokes, and have magnetic circuit portions 176A, 176B, 176C for actuating the magnetic sensitive element $174_1$, and also selectively have magnetic circuit portions 177B, 177C, 178C for selectively actuating the magnetic sensitive elements $174_2$, $174_3$. The magnetic circuit portions 177B, 177C, 178C serve as detectable members which represent the positions A, B, C. More specifically, these magnetic circuit portions 177B, 177C, 178C being present. The position B is represented by a value of "10" with the magnetic circuit portion 177B being present. The position C is represented by a value of "11" with the magnetic circuit portions 177C, 178C being present. The magnetic circuit portions 176A, 176B, 176C, 177B, 177C, 178C are of the same extent as each other in the direction along which the movable element 173 moves. The magnetic flux in the gap in each of these magnetic circuit portions is constant. When magnetic sensitive element $174_1$ passes through the gaps in the magnetic circuit portions 176A, 176B, 176C as the movable element 173 moves, the magnetic sensitive element $174_1$ generates an effectiveness signal whose amplitude is substantially constant. When the magnetic sensitive element $174_2$, passes through the gaps in the magnetic circuit portions 177B, 177C as the movable element 173 moves, the magnetic sensitive element $174_2$, generates a signal whose amplitude is substantially constant. Similarly, when the magnetic sensitive element $174_3$ passes through the gap in the magnetic circuit portion 178C as the movable element 173 moves, the magnetic sensitive element $174_3$ generates a signal whose amplitude is substantially constant.

Figure 28:
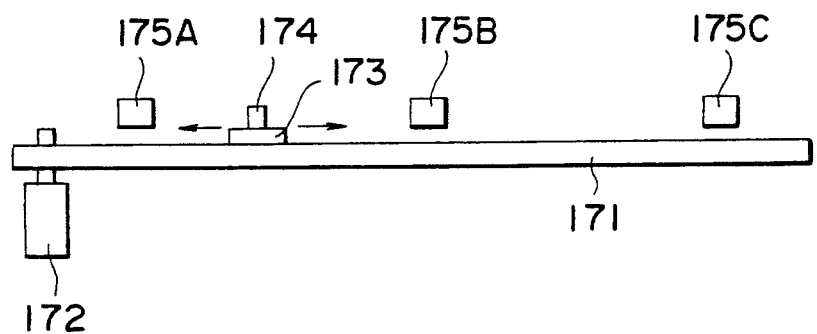
FIG. 28 is a schematic view of a positioning system according to a sixth embodiment of the present invention.
Figure 30:
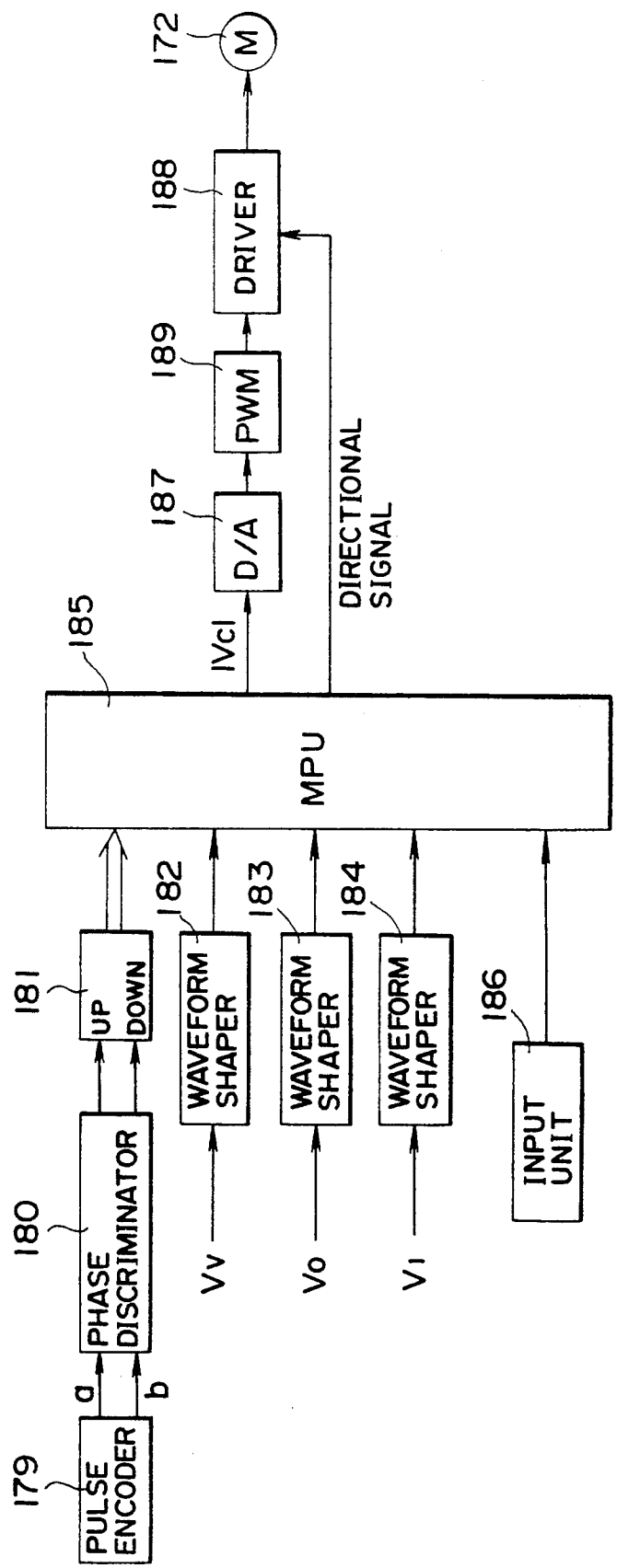
FIG. 30 is a block diagram of a control circuit of the positioning system of the sixth embodiment.
Figure 31:
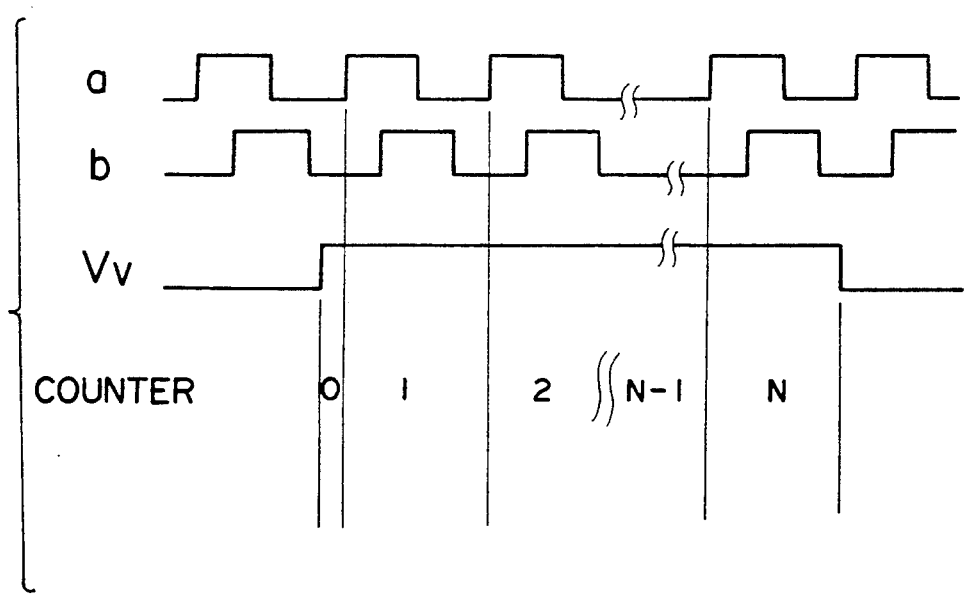
FIG. 31 is a timing chart of signals produced by the positioning system of the sixth embodiment.

FIG. 30 shows a control circuit of the positioning system shown in FIG. 28, and FIG. 31 illustrates the waveforms of signals produced by the positioning system.

A pulse encoder 179 serves to detect the movable element 173 in limited ranges near the stop positions A, B, C., and may be an optical pulse encoder, a magnetic pulse encoder, or the like. If the pulse encoder 179 is an optical pulse encoder, it comprises a photosensor integrally mounted on the movable element 173 and slitted plates disposed in the respective limited ranges near the positions A, B, C along the path of movable element 173. When the movable element 173 moves, the photosensor detects the slits in the slit plates and produces two-phase pulse signals a, b which are electrically 90° out of phase with each other. A phase discriminator 180 determines whether the phases of the two-phase pulse signals a, b from the pulse encoder 179 are advanced or delayed for thereby determining the direction in which the movable element 173 moves, and selectively applies the two-phase signals a, b to an up/down counter 181. When the movable element 173 moves to the right, for example, the phase discriminator 180 applies the pulse signal a to the up/down counter 181. Conversely, when the movable element 173 moves to the left, the phase discriminator 180 applies the pulse signal b to the up/down counter 181. Signals Vv, $V_0$, $V_1$ from the magnetic sensitive elements $174_1$, $174_2$, $174_3$ are shaped in waveform into binary signals by respective waveform shapers 182, 183, 184. The output signals Vv, $V_0$, $V_1$ from the waveform shapers 182, 183, 184 are applied to an MPU 185. The MPU 185 is supplied with a positioning command Vr indicative of a target position (one of the positions A, B, C) to which the movable element 173 is to be moved, the positioning command Vr being entered from an input unit 186 by the operator.

When the positioning command Vr is supplied from the input unit 186, the MPU 185 receives the output signals $V_0$, $V_1$ from the waveform shapers 183, 184 while receiving the effectiveness signal Vv from the waveform shaper 182, and determines the present position of the movable element 173 from these output signals $V_0$, $V_1$, as shown in FIG. 32. Then, the MPU 181 compares the present position and the positioning command Vr. If the present position is greater than the positioning command Vr, then the MPU 181 applies an output signal |Vc| to move the movable element 173 to the left to a D/A converter 187, and also applies a directional signal to a driver 188. If the present position is smaller than the positioning command Vr, then the MPU 181 applies an output signal |Vc| to move the movable element 173 to the right to the D/A converter 187, and also applies a directional signal to the driver 188. The output signal |Vc| from the MPU 181 is converted by the D/A converter 187 into an analog signal, which is then pulse-width-modulated by a PWM circuit 189. The driver 188 rotates the motor 172 in a direction corresponding to the directional signal from the MPU 181 with pulses from the PWM 189, thereby moving the movable element 173. If the present position of the movable element 173 substantially coincides with the positioning command Vr, since the movable element 173 is in the vicinity of the target position, the MPU 181 positions the movable element 173 in a servo loop. More specifically, if there are N pulses of each of the pulse signals a, b within the effectiveness signal Vv from the waveform shaper 182, then the MPU 181 sets "0" in the up/down counter 181 when the effectiveness signal Vv varies from a low level to a high level at the time the movable element 173 moves to the right, and sets "N" in the up/down counter 181 when the effectiveness signal Vv varies from a low level to a high level at the time the movable element 173 moves to the left. When the movable element 173 moves to the right, the up/down counter 181 counts up positive-going edges of the pulse signal a from the phase discriminator 180. When the movable element 173 moves to the left, the up/down counter 181 counts down positive-going edges of the pulse signal b from the phase discriminator 180. Consequently, when the present position of the movable element 173 substantially agrees with the positioning command Vr and the effectiveness signal Vv is issued from the waveform shaper 182, the count of the up/down counter 181 represents the present position of the movable element 173. When the present position of the movable element 173 substantially coincides with the positioning command Vr and the effectiveness signal Vv is supplied from the waveform shaper 182, the MPU 181 compares the count of the up/down counter 181 with the positioning command Vr, and supplies a directional signal depending on the positive or negative sign of the result of the comparison to the driver 188. When the count of the up/down counter 181 coincides with the positioning command Vr, the MPU 181 turns off the output signal |Vc| and the directional signal, thereby de-energizing the motor 172. The movable element 173 is therefore accurately positioned in the target position.

In the sixth embodiment, the movable element 173 can be stopped in any of the three predetermined positions in the fourth embodiment. However, the positioning system may be arranged such that the movable element may be stopped in any of two or four or more predetermined positions. If the movable element 173 should be stopped in any of four predetermined positions, then the magnetic circuit portions 177B, 177C, 178C may be arranged to produce four values of "00", "01", "10", "11". If the movable element 173 should be stopped in any of eight predetermined positions, then the magnetic circuit portions 177B, 177C, 178C may be arranged to produce eight values. The magnetic sensitive elements $174_1$, $174_2$, $174_3$, may be replaced with photosensors, and the magnetic circuit portions 175A, 175B, 175C may be replaced with slitted plates.

If the movable element were positioned in a commanded position in a servo loop using analog sensors having linear characteristics, then the positioning system would be low in positioning accuracy, and have a positioning resolution up to 80 $\mu$m. According to the sixth embodiment as described above, however, the pulse encoder generates a pulse signal in coaction with the movable element, and the position of the movable element is detected by position detecting means based on the pulse signal from the pulse encoder. The positioning resolution of the positioning system of the sixth embodiment is as high as 10 $\mu$m or 25 $\mu$m, for example, and hence the positioning system is highly accurate in positioning the movable element.

Although certain preferred embodiments have been shown and described, it should be understood that many changes and modifications may be made therein without departing from the scope of the appended claims.

What is claimed is:

1. A positioning system comprising:
   an actuator for moving a movable element along a path;
   a motor for operating said actuator to move the movable element;
   a plurality of position detectors for detecting the movable element within limited ranges near a plurality of predetermined positions along said path and for generating respective signals which vary depending on the position of the movable element; and
   a circuit for determining differences between output signals from said position detectors and a reference value, for selecting one of said differences depending on a positioning command, and for controlling said motor in a position servo loop based on said selected difference, wherein said circuit comprises:
   a plurality of amplifiers for determining the respective differences between the output signals from said position detectors and said reference value;
   selector means for selecting one of output signals from said amplifiers depending on the positioning command; and
   a motor driver for energizing said motor with an output signal from said selector means.

2. A positioning system comprising:
   a path along which a movable element is movable;
   a plurality of detectable members disposed within limited ranges near a plurality of positions along said path, said detectable members having mutually different detectable quantities;
   a position sensor integrally mounted on said movable element, for detecting said detectable quantities of said detectable members;

position detecting means for detecting a position of said movable element near each of said plurality of positions; and control means, responsive to a positioning command, for moving said movable element into the vicinity of a position indicated by said positioning command so that a signal detected by said position sensor will coincide with said positioning command, and for then positioning said movable element in said position indicated by said positioning command so that the position detected by said position detecting means will coincide with said positioning command.

3. A positioning system comprising:

an actuator for moving a movable element along a path;

a plurality of sensors for detecting the movable element within limited ranges near a plurality of predetermined positions along said path and for generating a plurality of two-phase signals;

a signal converting circuit for converting said two-phase signals into a single signal composed of signals corresponding to said two-phase signals and having a plurality of levels;

command means for giving a positioning command;

a comparator for comparing said positioning command given by said command means with said single signal from said signal converting means and for producing an output signal indicative of the difference between said positioning command and said single signal; and driver means for driving said actuator with the output signal from said comparator.

4. A positioning system according to claim 3, wherein said signal converting means comprises:

a phase discriminator for discriminating the phases of said two-phase signals to determine the direction in which the movable element moves;

a hold circuit for holding an output signal from said phase discriminator;

an analog switch for selectively issuing signals from said sensors and a reference voltage in response to an output signal from said hold circuit; and an adder for adding the signals of said sensors and the reference voltage from said analog switch into said single signal.

5. A positioning system comprising:

a path along which a movable element is movable;

a plurality of detectable members disposed within limited ranges near a plurality of positions along said path, said detectable members having respective values corresponding to said positions, respectively, and analog positional information indicative of linearly variable positional relationship thereof to the movable element near said positions;

driver means for moving said movable element;

a position sensor integrally mounted on said movable element, for detecting said values and said analog positional information from said detectable members; and control means, responsive to a positioning command, for controlling said driver means so that one of said values detected by said position sensor will coincide with a positioning command thereby to move said movable element into the vicinity of a position indicated by said positioning command, and for then controlling said driver means so that said analog positional information detected by said position sensor will coincide with said positioning command thereby position said movable element in said position indicated by said positioning command.

* * * * *

UNITED STATES PATENT AND TRADEMARK OFFICE
CERTIFICATE OF CORRECTION

PATENT NO. : 5,164,896
DATED : November 17, 1992
INVENTOR(S) : Isao Nagayasu

It is certified that error appears in the above-indentified patent and that said Letters Patent is hereby corrected as shown below:

On the title page, Item [30],

The Foreign Application Priority Data is incorrect, should be,

```
--Feb. 17, 1989   [JP]   Japan..........................1-17625[U]
  Nov. 27, 1989   [JP]   Japan..........................1-136923[U]
  Nov. 27, 1989   [JP]   Japan..........................1-136924[U]
  Nov. 27, 1989   [JP]   Japan..........................1-136925[U]
  Jan. 25, 1990   [JP]   Japan..........................2-5914[U]
  Jan. 25, 1990   [JP]   Japan..........................2-5915[U]--.
```

Signed and Sealed this

Nineteenth Day of October, 1993

Attest:

BRUCE LEHMAN

*Attesting Officer*      *Commissioner of Patents and Trademarks*